United States Patent
Park et al.

(10) Patent No.: US 10,651,901 B2
(45) Date of Patent: May 12, 2020

(54) METHOD FOR TRANSMITTING AND RECEIVING CHANNEL STATE INFORMATION IN MULTI-ANTENNA WIRELESS COMMUNICATION SYSTEM, AND APPARATUS THEREFOR

(71) Applicant: LG ELECTRONICS INC., Seoul (KR)

(72) Inventors: Haewook Park, Seoul (KR); Jonghyun Park, Seoul (KR); Kijun Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 1 day.

(21) Appl. No.: 16/069,413

(22) PCT Filed: Jan. 12, 2017

(86) PCT No.: PCT/KR2017/000402
§ 371 (c)(1),
(2) Date: Jul. 11, 2018

(87) PCT Pub. No.: WO2017/123018
PCT Pub. Date: Jul. 20, 2017

(65) Prior Publication Data
US 2019/0020386 A1    Jan. 17, 2019

Related U.S. Application Data

(60) Provisional application No. 62/277,920, filed on Jan. 12, 2016, provisional application No. 62/315,644, filed on Mar. 30, 2016.

(51) Int. Cl.
*H04B 7/0417* (2017.01)
*H04B 7/04* (2017.01)
(Continued)

(52) U.S. Cl.
CPC .............. *H04B 7/0417* (2013.01); *H04B 7/04* (2013.01); *H04B 7/0456* (2013.01); *H04B 7/06* (2013.01);
(Continued)

(58) Field of Classification Search
None
See application file for complete search history.

(56) References Cited

U.S. PATENT DOCUMENTS

2013/0114425 A1* 5/2013 Sayana ................. H04B 7/024
370/252
2013/0163687 A1 6/2013 Jing et al.
(Continued)

FOREIGN PATENT DOCUMENTS

KR    10-2015-0104556 A    9/2015
WO    WO-2014109557 A1 *  7/2014    ........... H04B 7/0417

OTHER PUBLICATIONS

Catt, "On Codebook Configuration for CSI Reporting Class A", RI-155211, 3GPP TSG RAN WG1 Meeting #82bis, Malmo, Sweden, Oct. 5-9, 2015.

*Primary Examiner* — Christine T Duong
(74) *Attorney, Agent, or Firm* — Birch, Stewart, Kolasch & Birch, LLP

(57) ABSTRACT

Disclosed are a method for transmitting and receiving channel state information in a multi-antenna wireless communication system, and an apparatus therefore. More specifically, a method for reporting, by a UE, channel state information (CSI) in a multi-antenna wireless communication system may include: receiving a channel state information reference signal (CSI-RS) on x multiple antenna ports from a base station; selecting y multiple antenna ports from among the x multiple antenna ports; and reporting, to the base station, a precoding matrix indicator (PMI) indicating a precoding matrix selected from a codebook for the y multiple antenna ports.

12 Claims, 22 Drawing Sheets

(51) Int. Cl.
 H04B 7/06 (2006.01)
 H04W 76/27 (2018.01)
 H04B 7/0456 (2017.01)
 H04L 5/00 (2006.01)
(52) U.S. Cl.
 CPC ........... *H04B 7/063* (2013.01); *H04B 7/0626* (2013.01); *H04B 7/0639* (2013.01); *H04L 5/0057* (2013.01); *H04W 76/27* (2018.02); *H04L 5/005* (2013.01); *H04L 5/0051* (2013.01)

(56) References Cited

U.S. PATENT DOCUMENTS

2014/0016549 A1* 1/2014 Novlan ................ H04B 7/0417
 370/328
2014/0086353 A1 3/2014 Ni et al.
2014/0211873 A1 7/2014 Park et al.

* cited by examiner

Fig. 14
(M, N, P, Q) = (2, 2, 2, 8)   (M, N, P, Q) = (2, 3, 2, 12)   (M, N, P, Q) = (2, 4, 2, 16)
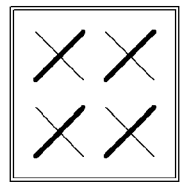 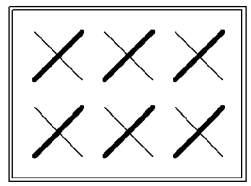 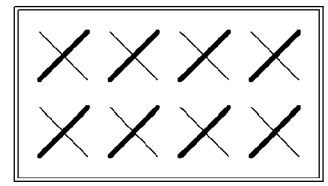
(M, N, P, Q) = (3, 2, 2, 12)   (M, N, P, Q) = (4, 2, 2, 16)
(a)
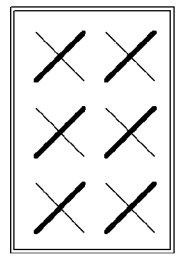 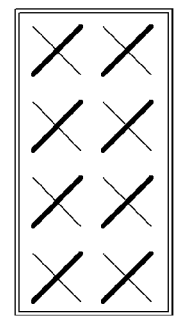
 (1, 8, 2, 16)
(b)
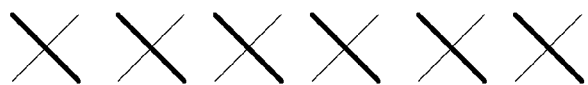 (1, 6, 2, 12)

Fig. 15
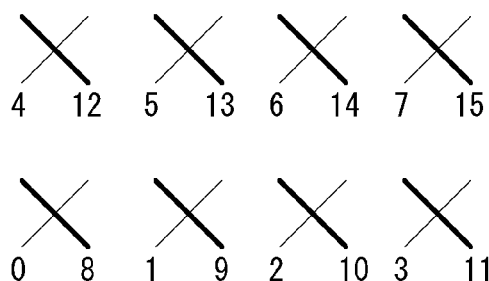
(a)
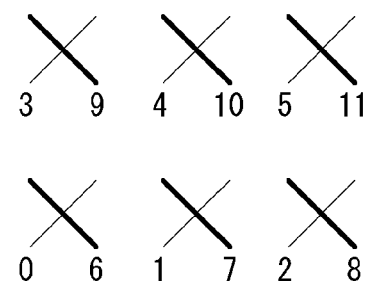
(b)

Fig. 16
Selected Ports
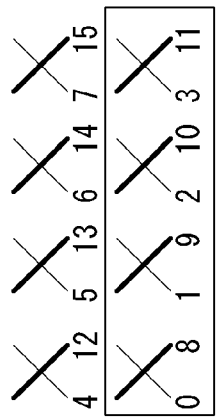
Config 4
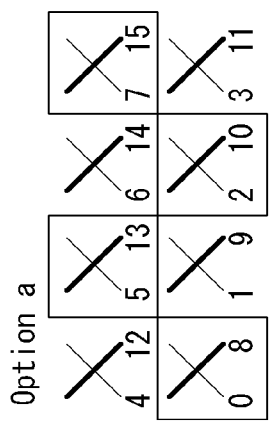
Option a
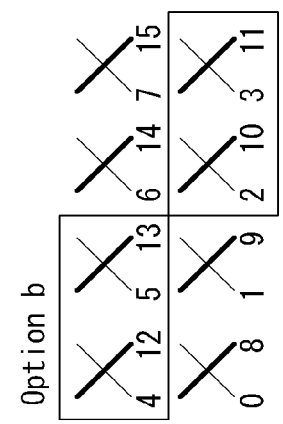
Option b
Config 3
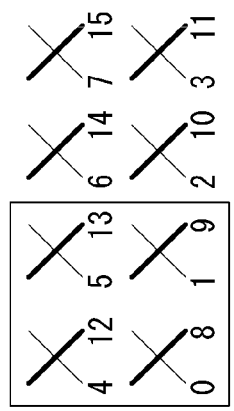
Config 1, 2

METHOD FOR TRANSMITTING AND RECEIVING CHANNEL STATE INFORMATION IN MULTI-ANTENNA WIRELESS COMMUNICATION SYSTEM, AND APPARATUS THEREFOR

CROSS REFERENCE TO RELATED APPLICATIONS

This application is the National Phase of PCT International Application No. PCT/KR2017/000402, filed on Jan. 12, 2017, which claims priority under 35 U.S.C. 119(e) to U.S. Provisional Application No. 62/277,920, filed on Jan. 12, 2016 and 62/315,644 filed on Mar. 30, 2016, all of which are hereby expressly incorporated by reference into the present application.

TECHNICAL FIELD

The present invention relates to a wireless communication system, and more particularly, to a method and an apparatus for transmitting and receiving channel state information in a wireless communication system supporting a multi-antenna system (in particular, 2 dimensional active antenna system (2D AAS)).

BACKGROUND ART

Mobile communication systems have been developed to provide voice services, while guaranteeing user activity. Service coverage of mobile communication systems, however, has extended even to data services, as well as voice services, and currently, an explosive increase in traffic has resulted in shortage of resource and user demand for a high speed services, requiring advanced mobile communication systems.

The requirements of the next-generation mobile communication system may include supporting huge data traffic, a remarkable increase in the transfer rate of each user, the accommodation of a significantly increased number of connection devices, very low end-to-end latency, and high energy efficiency. To this end, various techniques, such as small cell enhancement, dual connectivity, massive Multiple Input Multiple Output (MIMO), in-band full duplex, non-orthogonal multiple access (NOMA), supporting super-wide band, and device networking, have been researched.

DISCLOSURE

Technical Problem

An embodiment of the present invention proposes a method for channel state information in a wireless communication system supporting a multi-antenna system (in particular, 2D AAS).

Furthermore, an embodiment of the present invention provides a method for constructing a codebook for a smaller number of antenna ports than all transmission antennas in a multi-antenna system (in particular, 2D AAS) and a method for transmitting and receiving channel state information using the same.

The technical objects of the present invention are not limited to the aforementioned technical objects, and other technical objects, which are not mentioned above, will be apparently appreciated by a person having ordinary skill in the art from the following description.

Technical Solution

In an aspect of the present invention, a method for reporting, by a UE, channel state information (CSI) in a multi-antenna wireless communication system may include: receiving a channel state information reference signal (CSI-RS) on x multiple antenna ports from a base station; selecting y multiple antenna ports from among the x multiple antenna ports; and reporting, to the base station, a precoding matrix indicator (PMI) indicating a precoding matrix selected from a codebook for the y multiple antenna ports.

In another aspect of the present invention, a UE for reporting channel state information (CSI) in a multi-antenna wireless communication system may include: a radio frequency (RF) unit for transmitting and receiving a radio signal; and a processor for controlling the RF unit, and the processor may receive a channel state information reference signal (CSI-RS) on x multiple antenna ports from a base station, select y multi-antenna ports among the x multi-antenna ports, and report to the base station a precoding matrix indicator (PMI) indicating a precoding matrix selected from a codebook for the y multi-antenna ports.

Preferably, the precoding matrix may be selected to maximize a channel quality indicator (CQI) derived based on the CSI-RS transmitted on the y multi-antenna ports.

Preferably, the y multi-antenna ports may selected with the same antenna port as the antenna port layout applicable to the codebook for the y multi-antenna ports among the x multi-antenna ports.

Preferably, the x multi-antenna ports may be grouped into a first antenna port group and a second antenna port group in units of the y multi-antenna ports, the precoding matrix may be selected based on a weighted summation of a first channel measured based on the CSI-RS transmitted on the antenna port in a first antenna port group and a second channel measured based on the CSI-RS transmitted on the antenna port in a second antenna port group, and the precoding matrix may be similarly applied to the first antenna port group and the second antenna port group.

Preferably, the first channel and the second channel may summed by a first weight and a second weight, respectively, and the first weight and the second weight may be predetermined or provided from the base station to the UE through radio resource (RRC) signaling.

Preferably, the first channel and the second channel may be summed by the first weight and the second weight, respectively, and the first weight and the second weight may be determined by the UE and reported to the base station.

Preferably, the first weight and the second weight may be determined from a predetermined weight vector codebook.

Preferably, the entirety or a subset of the weight vector codebook may be used according to the number of feedback bits for reporting the first weight and second weight.

Preferably, the method may further include receiving a codebook configuration from the base station, and the y multi-antenna ports may be selected according to the codebook configuration.

Preferably, the CSI for the y multi-antenna ports may be calculated by multiplying by a power compensation coefficient at the time of the CSI calculation, and the power compensation coefficient may be predetermined or provided from the base station to the UE by the radio resource control (RRC) signaling.

Preferably, whether the CSI for the y multi-antenna ports is calculated by multiplying by the power compensation coefficient at the time of the CSI calculation is provided from the base station through the radio resource control (RRC) signaling.

Preferably, only in the case of a specific rank, the y multi-antenna ports may be selected among the x multi-antenna ports, and the specific rank may be predetermined or provided from the base station to the UE by the radio resource control (RRC) signaling.

Advantageous Effects

According to the embodiment of the present invention, feedback overhead for reporting channel state can be remarkably reduced in the wireless communication system supporting the multi-antenna system (in particular, 2D AAS).

Effects which can be obtained in the present invention are not limited to the aforementioned effects and other unmentioned effects will be clearly understood by those skilled in the art from the following description.

DESCRIPTION OF DRAWINGS

The accompanying drawings, which are included herein as a part of the description for help understanding the present invention, provide embodiments of the present invention, and describe the technical features of the present invention with the description below.

FIG. 14 is a diagram illustrating an antenna layout usable in a wireless communication system to which the present invention may be applied.

FIG. 15 is a diagram illustrating an antenna layout usable in a wireless communication system to which the present invention may be applied.

FIG. 16 illustrates a method for selecting an antenna port for each codebook configuration according to an embodiment of the present invention.

MODE FOR INVENTION

Figure 1:
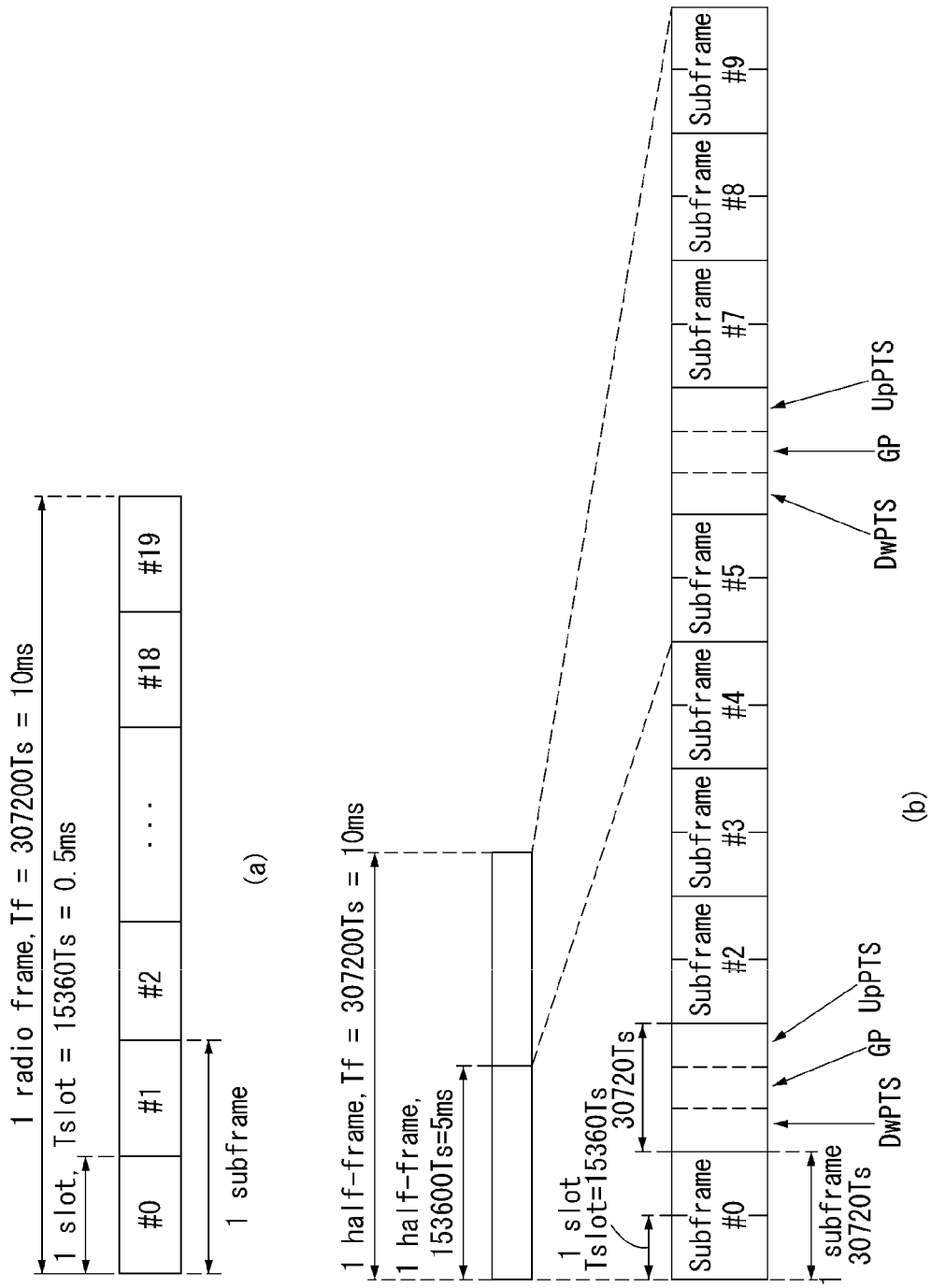
FIG. 1 illustrates the structure of a radio frame in a wireless communication system to which the present invention may be applied.

Some embodiments of the present invention are described in detail with reference to the accompanying drawings. A detailed description to be disclosed along with the accompanying drawings are intended to describe some embodiments of the present invention and are not intended to describe a sole embodiment of the present invention. The following detailed description includes more details in order to provide full understanding of the present invention. However, those skilled in the art will understand that the present invention may be implemented without such more details.

In some cases, in order to avoid that the concept of the present invention becomes vague, known structures and devices are omitted or may be shown in a block diagram form based on the core functions of each structure and device.

In this specification, a base station has the meaning of a terminal node of a network over which the base station directly communicates with a device. In this document, a specific operation that is described to be performed by a base station may be performed by an upper node of the base station according to circumstances. That is, it is evident that in a network including a plurality of network nodes including a base station, various operations performed for communication with a device may be performed by the base station or other network nodes other than the base station. The base station (BS) may be substituted with another term, such as a fixed station, a Node B, an eNB (evolved-NodeB), a Base Transceiver System (BTS), or an access point (AP). Furthermore, the device may be fixed or may have mobility and may be substituted with another term, such as User Equipment (UE), a Mobile Station (MS), a User Terminal (UT), a Mobile Subscriber Station (MSS), a Subscriber Station (SS), an Advanced Mobile Station (AMS), a Wireless Terminal (WT), a Machine-Type Communication (MTC) device, a Machine-to-Machine (M2M) device, or a Device-to-Device (D2D) device.

Hereinafter, downlink (DL) means communication from an eNB to UE, and uplink (UL) means communication from UE to an eNB. In DL, a transmitter may be part of an eNB, and a receiver may be part of UE. In UL, a transmitter may be part of UE, and a receiver may be part of an eNB.

Specific terms used in the following description have been provided to help understanding of the present invention, and the use of such specific terms may be changed in various forms without departing from the technical sprit of the present invention.

The following technologies may be used in a variety of wireless communication systems, such as Code Division Multiple Access (CDMA), Frequency Division Multiple Access (FDMA), Time Division Multiple Access (TDMA), Orthogonal Frequency Division Multiple Access (OFDMA), Single Carrier Frequency Division Multiple Access (SC-FDMA), and Non-Orthogonal Multiple Access (NOMA). CDMA may be implemented using a radio technology, such as Universal Terrestrial Radio Access (UTRA) or CDMA2000. TDMA may be implemented using a radio technology, such as Global System for Mobile communications (GSM)/General Packet Radio Service (GPRS)/Enhanced Data rates for GSM Evolution (EDGE). OFDMA may be implemented using a radio technology, such as Institute of Electrical and Electronics Engineers (IEEE) 802.11 (Wi-Fi), IEEE 802.16 (WiMAX), IEEE 802.20, or Evolved UTRA (E-UTRA). UTRA is part of a Universal Mobile Telecommunications System (UMTS). 3rd Generation Partnership Project (3GPP) Long Term Evolution (LTE) is part of an Evolved UMTS (E-UMTS) using evolved UMTS Terrestrial Radio Access (E-UTRA), and it adopts OFDMA in downlink and adopts SC-FDMA in uplink. LTE-Advanced (LTE-A) is the evolution of 3GPP LTE.

Embodiments of the present invention may be supported by the standard documents disclosed in at least one of IEEE 802, 3GPP, and 3GPP2, that is, radio access systems. That is, steps or portions that belong to the embodiments of the present invention and that are not described in order to clearly expose the technical spirit of the present invention may be supported by the documents. Furthermore, all terms disclosed in this document may be described by the standard documents.

In order to more clarify a description, 3GPP LTE/LTE-A is chiefly described, but the technical characteristics of the present invention are not limited thereto.

General System to which the Present Invention May be Applied

FIG. 1 shows the structure of a radio frame in a wireless communication system to which an embodiment of the present invention may be applied.

3GPP LTE/LTE-A support a radio frame structure type 1 which may be applicable to Frequency Division Duplex (FDD) and a radio frame structure which may be applicable to Time Division Duplex (TDD).

The size of a radio frame in the time domain is represented as a multiple of a time unit of $T\_s=1/(15000*2048)$. A UL and DL transmission includes the radio frame having a duration of $T\_f=307200*T\_s=10$ ms.

FIG. 1(a) exemplifies a radio frame structure type 1. The type 1 radio frame may be applied to both of full duplex FDD and half duplex FDD.

A radio frame includes 10 subframes. A radio frame includes 20 slots of $T\_slot=15360*T\_s=0.5$ ms length, and 0 to 19 indexes are given to each of the slots. One subframe includes consecutive two slots in the time domain, and subframe i includes slot 2i and slot 2i+1. The time required for transmitting a subframe is referred to as a transmission time interval (TTI). For example, the length of the subframe i may be 1 ms and the length of a slot may be 0.5 ms.

A UL transmission and a DL transmission I the FDD are distinguished in the frequency domain. Whereas there is no restriction in the full duplex FDD, a UE may not transmit and receive simultaneously in the half duplex FDD operation.

One slot includes a plurality of Orthogonal Frequency Division Multiplexing (OFDM) symbols in the time domain and includes a plurality of Resource Blocks (RBs) in a frequency domain. In 3GPP LTE, OFDM symbols are used to represent one symbol period because OFDMA is used in downlink. An OFDM symbol may be called one SC-FDMA symbol or symbol period. An RB is a resource allocation unit and includes a plurality of contiguous subcarriers in one slot.

FIG. 1(b) shows frame structure type 2.

A type 2 radio frame includes two half frame of $153600*T\_s=5$ ms length each. Each half frame includes 5 subframes of $30720*T\_s=1$ ms length.

In the frame structure type 2 of a TDD system, an uplink-downlink configuration is a rule indicating whether uplink and downlink are allocated (or reserved) to all subframes.

Table 1 shows the uplink-downlink configuration.

TABLE 1

| Uplink-Downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

Referring to Table 1, in each subframe of the radio frame, 'D' represents a subframe for a DL transmission, 'U' represents a subframe for UL transmission, and 'S' represents a special subframe including three types of fields including a Downlink Pilot Time Slot (DwPTS), a Guard Period (GP), and a Uplink Pilot Time Slot (UpPTS).

A DwPTS is used for an initial cell search, synchronization or channel estimation in a UE. A UpPTS is used for channel estimation in an eNB and for synchronizing a UL transmission synchronization of a UE. A GP is duration for removing interference occurred in a UL owing to multi-path delay of a DL signal between a UL and a DL.

Each subframe i includes slot 2i and slot 2i+1 of $T\_slot=15360*T\_s=0.5$ ms.

The UL-DL configuration may be classified into 7 types, and the position and/or the number of a DL subframe, a special subframe and a UL subframe are different for each configuration.

A point of time at which a change is performed from downlink to uplink or a point of time at which a change is performed from uplink to downlink is called a switching point. The periodicity of the switching point means a cycle in which an uplink subframe and a downlink subframe are changed is identically repeated. Both 5 ms and 10 ms are supported in the periodicity of a switching point. If the periodicity of a switching point has a cycle of a 5 ms downlink-uplink switching point, the special subframe S is present in each half frame. If the periodicity of a switching point has a cycle of a 5 ms downlink-uplink switching point, the special subframe S is present in the first half frame only.

In all the configurations, 0 and 5 subframes and a DwPTS are used for only downlink transmission. An UpPTS and a subframe subsequent to a subframe are always used for uplink transmission.

Such uplink-downlink configurations may be known to both an eNB and UE as system information. An eNB may notify UE of a change of the uplink-downlink allocation state of a radio frame by transmitting only the index of uplink-downlink configuration information to the UE whenever the uplink-downlink configuration information is changed. Furthermore, configuration information is kind of downlink control information and may be transmitted through a Physical Downlink Control Channel (PDCCH) like other scheduling information. Configuration information may be transmitted to all UEs within a cell through a broadcast channel as broadcasting information.

Table 2 represents configuration (length of DwPTS/GP/UpPTS) of a special subframe.

TABLE 2

| Special subframe configuration | Normal cyclic prefix in downlink | | | Extended cyclic prefix in downlink | | |
|---|---|---|---|---|---|---|
| | | UpPTS | | | UpPTS | |
| | DwPTS | Normal cyclic prefix in uplink | Extended cyclic prefix in uplink | DwPTS | Normal cyclic prefix in uplink | Extended cyclic prefix in uplink |
| 0 | 6592 · $T_s$ | 2192 · $T_s$ | 2560 · $T_s$ | 7680 · $T_s$ | 2192 · $T_s$ | 2560 · $T_s$ |
| 1 | 19760 · $T_s$ | | | 20480 · $T_s$ | | |
| 2 | 21952 · $T_s$ | | | 23040 · $T_s$ | | |
| 3 | 24144 · $T_s$ | | | 25600 · $T_s$ | | |
| 4 | 26336 · $T_s$ | | | 7680 · $T_s$ | 4384 · $T_s$ | 5120 · $T_s$ |
| 5 | 6592 · $T_s$ | 4384 · $T_s$ | 5120 · $T_s$ | 20480 · $T_s$ | | |
| 6 | 19760 · $T_s$ | | | 23040 · $T_s$ | | |
| 7 | 21952 · $T_s$ | | | — | — | — |
| 8 | 24144 · $T_s$ | | | — | — | — |

The structure of a radio subframe according to the example of FIG. 1 is just an example, and the number of subcarriers included in a radio frame, the number of slots included in a subframe and the number of OFDM symbols included in a slot may be changed in various manners.

Figure 2:
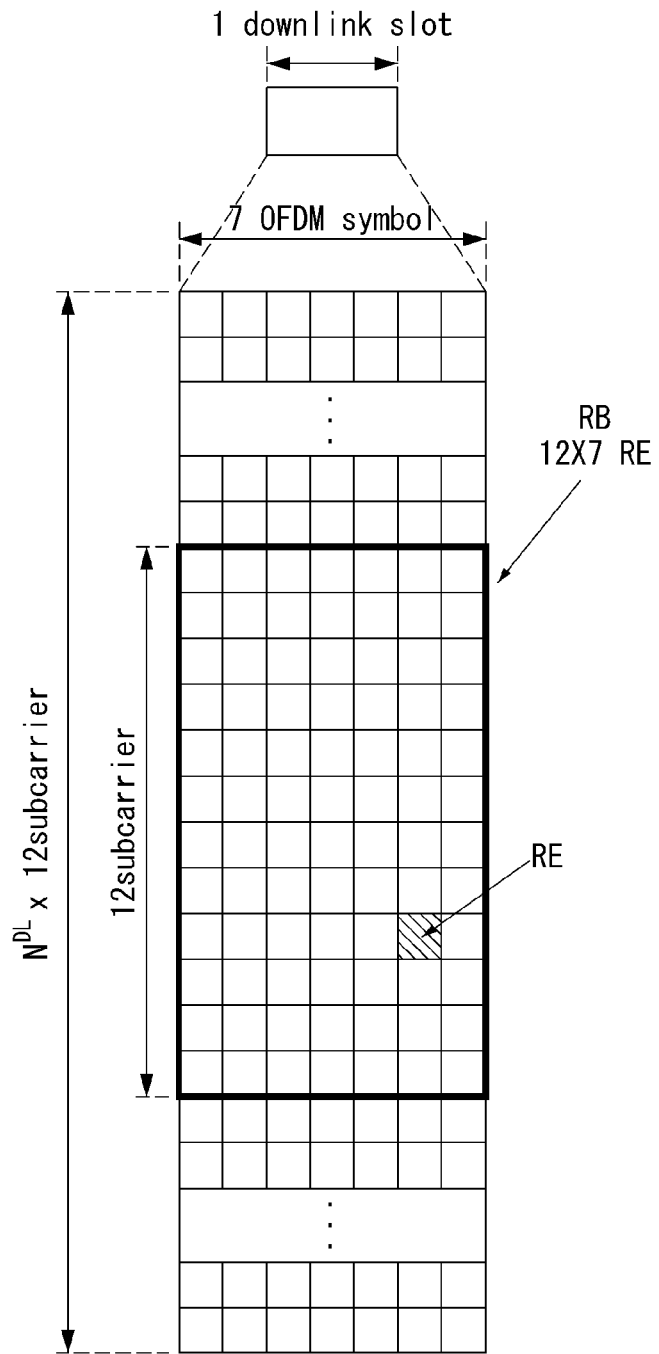
FIG. 2 is a diagram illustrating a resource grid for a downlink slot in a wireless communication system to which the present invention may be applied.

FIG. 2 is a diagram illustrating a resource grid for one downlink slot in a wireless communication system to which an embodiment of the present invention may be applied.

Referring to FIG. 2, one downlink slot includes a plurality of OFDM symbols in a time domain. It is described herein that one downlink slot includes 7 OFDMA symbols and one resource block includes 12 subcarriers for exemplary purposes only, and the present invention is not limited thereto.

Each element on the resource grid is referred to as a resource element, and one resource block (RB) includes 12×7 resource elements. The number of RBs N^DL included in a downlink slot depends on a downlink transmission bandwidth.

The structure of an uplink slot may be the same as that of a downlink slot.

Figure 3:
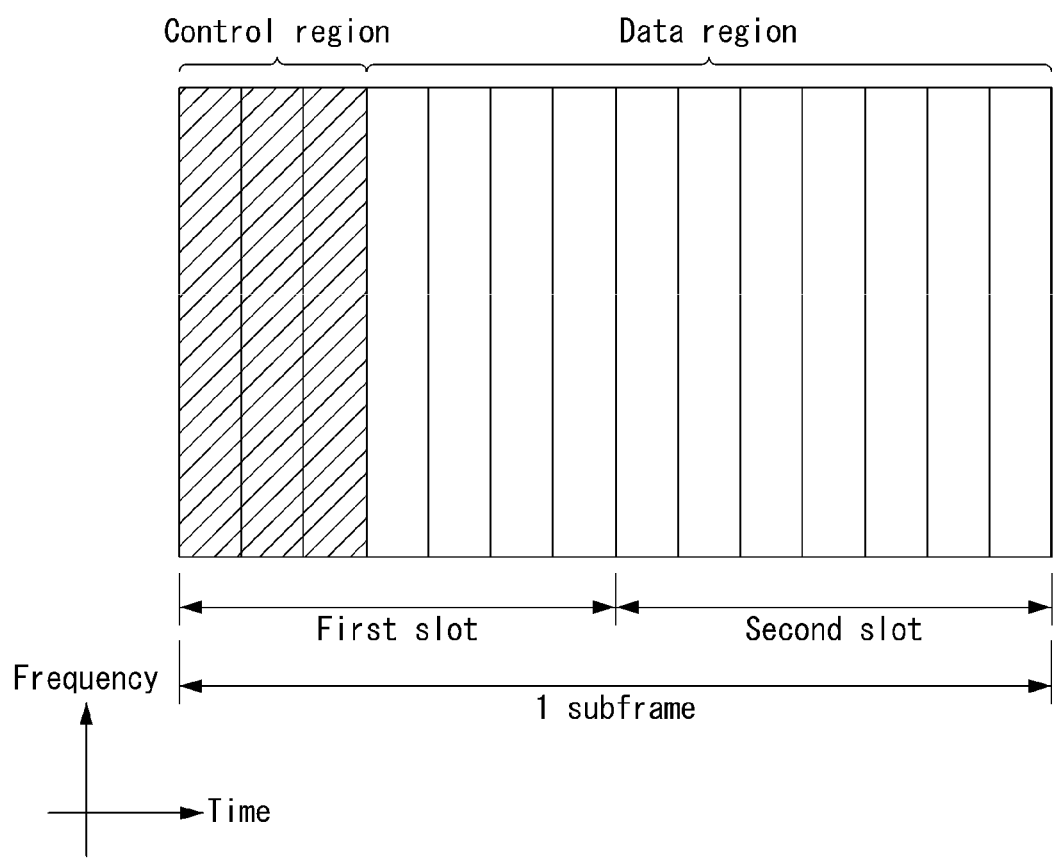
FIG. 3 illustrates a structure of downlink subframe in a wireless communication system to which the present invention may be applied.

FIG. 3 shows the structure of a downlink subframe in a wireless communication system to which an embodiment of the present invention may be applied.

Referring to FIG. 3, a maximum of three OFDM symbols located in a front portion of a first slot of a subframe correspond to a control region in which control channels are allocated, and the remaining OFDM symbols correspond to a data region in which a physical downlink shared channel (PDSCH) is allocated. Downlink control channels used in 3GPP LTE include, for example, a physical control format indicator channel (PCFICH), a physical downlink control channel (PDCCH), and a physical hybrid-ARQ indicator channel (PHICH).

A PCFICH is transmitted in the first OFDM symbol of a subframe and carries information about the number of OFDM symbols (i.e., the size of a control region) which is used to transmit control channels within the subframe. A PHICH is a response channel for uplink and carries an acknowledgement (ACK)/not-acknowledgement (NACK) signal for a Hybrid Automatic Repeat Request (HARQ). Control information transmitted in a PDCCH is called Downlink Control Information (DCI). DCI includes uplink resource allocation information, downlink resource allocation information, or an uplink transmission (Tx) power control command for a specific UE group.

A PDCCH may carry information about the resource allocation and transport format of a downlink shared channel (DL-SCH) (this is also called an "downlink grant"), resource allocation information about an uplink shared channel (UL-SCH) (this is also called a "uplink grant"), paging information on a PCH, system information on a DL-SCH, the resource allocation of a higher layer control message, such as a random access response transmitted on a PDSCH, a set of transmission power control commands for individual UE within specific UE group, and the activation of a Voice over Internet Protocol (VoIP), etc. A plurality of PDCCHs may be transmitted within the control region, and UE may monitor a plurality of PDCCHs. A PDCCH is transmitted on a single Control Channel Element (CCE) or an aggregation of some contiguous CCEs. A CCE is a logical allocation unit that is used to provide a PDCCH with a coding rate according to the state of a radio channel. A CCE corresponds to a plurality of resource element groups. The format of a PDCCH and the number of available bits of a PDCCH are determined by an association relationship between the number of CCEs and a coding rate provided by CCEs.

An eNB determines the format of a PDCCH based on DCI to be transmitted to UE and attaches a Cyclic Redundancy Check (CRC) to control information. A unique identifier (a Radio Network Temporary Identifier (RNTI)) is masked to the CRC depending on the owner or use of a PDCCH. If the PDCCH is a PDCCH for specific UE, an identifier unique to the UE, for example, a Cell-RNTI (C-RNTI) may be masked to the CRC. If the PDCCH is a PDCCH for a paging message, a paging indication identifier, for example, a Paging-RNTI (P-RNTI) may be masked to the CRC. If the PDCCH is a PDCCH for system information, more specifically, a System Information Block (SIB), a system information identifier, for example, a System Information-RNTI (SI-RNTI) may be masked to the CRC. A Random Access-RNTI (RA-RNTI) may be masked to the CRC in order to indicate a random access response which is a response to the transmission of a random access preamble by UE.

Figure 4:
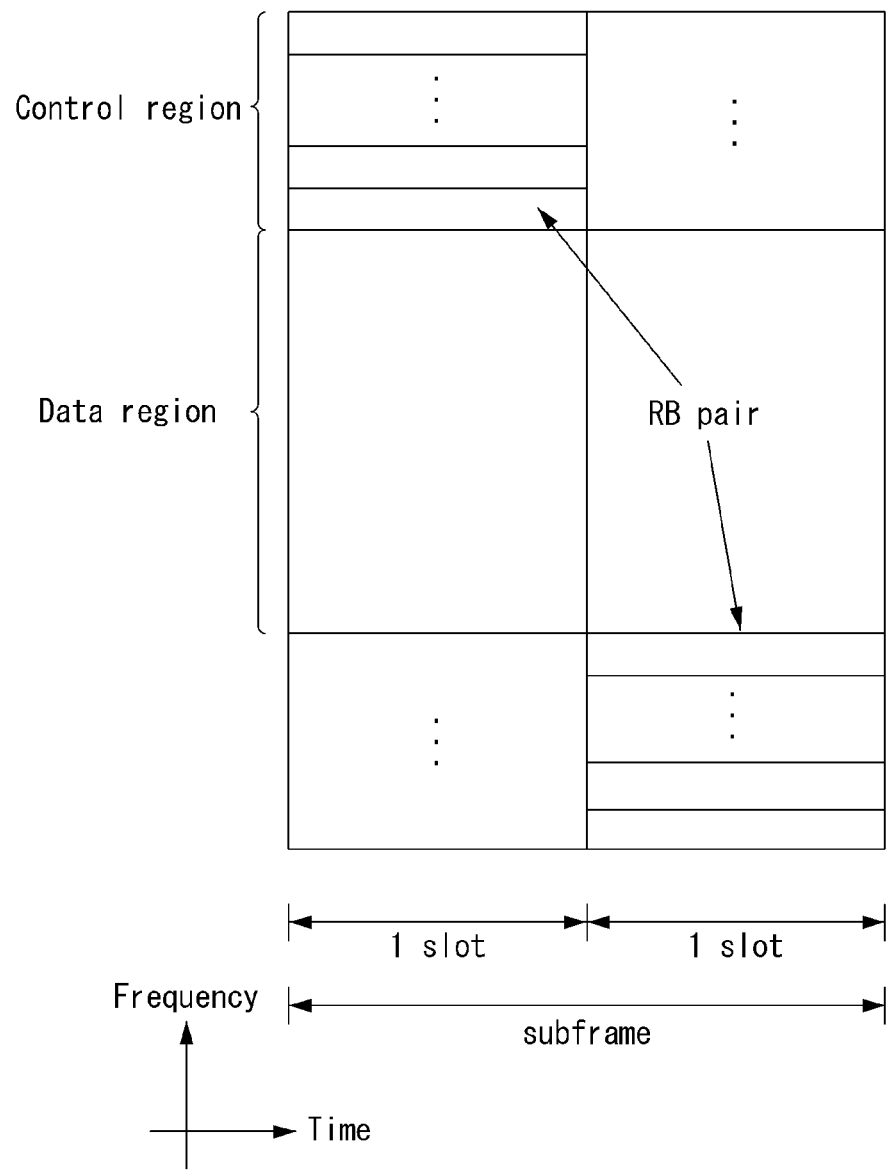
FIG. 4 illustrates a structure of uplink subframe in a wireless communication system to which the present invention may be applied.

FIG. 4 shows the structure of an uplink subframe in a wireless communication system to which an embodiment of the present invention may be applied.

Referring to FIG. 4, the uplink subframe may be divided into a control region and a data region in a frequency domain. A physical uplink control channel (PUCCH) carrying uplink control information is allocated to the control region. A physical uplink shared channel (PUSCH) carrying user data is allocated to the data region. In order to maintain single carrier characteristic, one UE does not send a PUCCH and a PUSCH at the same time.

A Resource Block (RB) pair is allocated to a PUCCH for one UE within a subframe. RBs belonging to an RB pair occupy different subcarriers in each of 2 slots. This is called that an RB pair allocated to a PUCCH is frequency-hopped in a slot boundary.

Multi-Input Multi-Output (MIMO)

A MIMO technology does not use single transmission antenna and single reception antenna that have been commonly used so far, but uses a multi-transmission (Tx) antenna and a multi-reception (Rx) antenna. In other words, the MIMO technology is a technology for increasing a capacity or enhancing performance using multi-input/output antennas in the transmission end or reception end of a wireless communication system. Hereinafter, MIMO is called a "multi-input/output antenna.".

More specifically, the multi-input/output antenna technology does not depend on a single antenna path in order to receive a single total message and completes total data by collecting a plurality of data pieces received through several antennas. As a result, the multi-input/output antenna technology can increase a data transfer rate within a specific system range and can also increase a system range through a specific data transfer rate.

It is expected that an efficient multi-input/output antenna technology will be used because next-generation mobile communication requires a data transfer rate much higher than that of existing mobile communication. In such a situation, the MIMO communication technology is a next-generation mobile communication technology which may be widely used in mobile communication UE and a relay node and has been in the spotlight as a technology which may overcome a limit to the transfer rate of another mobile communication attributable to the expansion of data communication.

Meanwhile, the multi-input/output antenna (MIMO) technology of various transmission efficiency improvement technologies that are being developed has been most in the spotlight as a method capable of significantly improving a communication capacity and transmission/reception performance even without the allocation of additional frequencies or a power increase.

Figure 5:
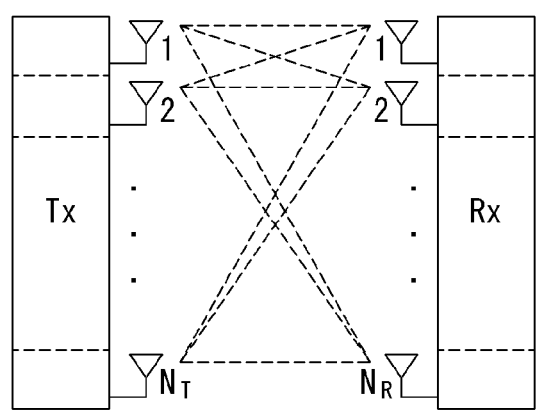
FIG. 5 shows the configuration of a known MIMO communication system.

FIG. 5 shows the configuration of a known MIMO communication system.

Referring to FIG. 5, if the number of transmission (Tx) antennas is increased to N_T and the number of reception (Rx) antennas is increased to N_R at the same time, a theoretical channel transmission capacity is increased in proportion to the number of antennas, unlike in the case where a plurality of antennas is used only in a transmitter or a receiver. Accordingly, a transfer rate can be improved, and frequency efficiency can be significantly improved. In this case, a transfer rate according to an increase of a channel transmission capacity may be theoretically increased by a value obtained by multiplying the following rate increment R_i by a maximum transfer rate R_o if one antenna is used.

$$R_i = \min(N_T, N_R) \quad \text{[Equation 1]}$$

That is, in an MIMO communication system using 4 transmission antennas and 4 reception antennas, for example, a quadruple transfer rate can be obtained theoretically compared to a single antenna system.

Such a multi-input/output antenna technology may be divided into a spatial diversity method for increasing transmission reliability using symbols passing through various channel paths and a spatial multiplexing method for improving a transfer rate by sending a plurality of data symbols at the same time using a plurality of transmission antennas. Furthermore, active research is being recently carried out on a method for properly obtaining the advantages of the two methods by combining the two methods.

Each of the methods is described in more detail below.

First, the spatial diversity method includes a space-time block code-series method and a space-time Trelis code-series method using a diversity gain and a coding gain at the same time. In general, the Trelis code-series method is better in terms of bit error rate improvement performance and the degree of a code generation freedom, whereas the space-time block code-series method has low operational complexity. Such a spatial diversity gain may correspond to an amount corresponding to the product (N_T×N_R) of the number of transmission antennas (N_T) and the number of reception antennas (N_R).

Second, the spatial multiplexing scheme is a method for sending different data streams in transmission antennas. In this case, in a receiver, mutual interference is generated between data transmitted by a transmitter at the same time. The receiver removes the interference using a proper signal processing scheme and receives the data. A noise removal method used in this case may include a Maximum Likelihood Detection (MLD) receiver, a Zero-Forcing (ZF) receiver, a Minimum Mean Square Error (MMSE) receiver, Diagonal-Bell Laboratories Layered Space-Time (D-BLAST), and Vertical-Bell Laboratories Layered Space-Time (V-BLAST). In particular, if a transmission end can be aware of channel information, a Singular Value Decomposition (SVD) method may be used.

Third, there is a method using a combination of a spatial diversity and spatial multiplexing. If only a spatial diversity gain is to be obtained, a performance improvement gain according to an increase of a diversity disparity is gradually saturated. If only a spatial multiplexing gain is used, transmission reliability in a radio channel is deteriorated. Methods for solving the problems and obtaining the two gains have been researched and may include a double space-time transmit diversity (double-STTD) method and a space-time bit interleaved coded modulation (STBICM).

In order to describe a communication method in a multi-input/output antenna system, such as that described above, in more detail, the communication method may be represented as follows through mathematical modeling.

First, as shown in FIG. 5, it is assumed that N_T transmission antennas and NR reception antennas are present.

First, a transmission signal is described below. If the N_T transmission antennas are present as described above, a maximum number of pieces of information which can be transmitted are N_T, which may be represented using the following vector.

$$s=[s_1, s_2, \ldots, s_{N_T}]^T \quad \text{[Equation 2]}$$

Meanwhile, transmission power may be different in each of pieces of transmission information s_1, s_2, ..., s_NT. In this case, if pieces of transmission power are P_1, P_2, ..., P_NT, transmission information having controlled transmission power may be represented using the following vector.

$$\hat{s}=[\hat{s}_1, \hat{s}_2, \ldots, \hat{s}_{N_T}]^T = [P_1 s_1, P_2 s_2, \ldots, P_{N_T} s_{N_T}]^T \quad \text{[Equation 3]}$$

Furthermore, transmission information having controlled transmission power in the Equation 3 may be represented as follows using the diagonal matrix P of transmission power.

$$\hat{s} = \begin{bmatrix} P_1 & & & 0 \\ & P_2 & & \\ & & \ddots & \\ 0 & & & P_{N_T} \end{bmatrix} \begin{bmatrix} s_1 \\ s_2 \\ \vdots \\ s_{N_T} \end{bmatrix} = Ps \quad \text{[Equation 4]}$$

Meanwhile, the information vector having controlled transmission power in the Equation 4 is multiplied by a weight matrix W, thus forming N_T transmission signals x_1, x_2, ..., x_NT that are actually transmitted. In this case, the weight matrix functions to properly distribute the transmission information to antennas according to a transport channel condition. The following may be represented using the transmission signals x_1, x_2, ..., x_NT.

$$x = \quad \text{[Equation 5]}$$

$$\begin{bmatrix} x_1 \\ x_2 \\ \vdots \\ x_i \\ \vdots \\ x_{N_T} \end{bmatrix} = \begin{bmatrix} w_{11} & w_{12} & \cdots & w_{1N_T} \\ w_{21} & w_{22} & \cdots & w_{2N_T} \\ \vdots & & \ddots & \\ w_{i1} & w_{i2} & \cdots & w_{iN_T} \\ \vdots & & & \ddots \\ w_{N_T 1} & w_{N_T 2} & \cdots & w_{N_T N_T} \end{bmatrix} \begin{bmatrix} \hat{s}_1 \\ \hat{s}_2 \\ \vdots \\ \hat{s}_j \\ \vdots \\ \hat{s}_{N_T} \end{bmatrix} = W\hat{s} = WPs$$

In this case, w_ij denotes weight between an i-th transmission antenna and a j-th transmission information, and W is an expression of a matrix of the weight. Such a matrix W is called a weight matrix or precoding matrix.

Meanwhile, the transmission signal x, such as that described above, may be considered to be used in a case where a spatial diversity is used and a case where spatial multiplexing is used.

If spatial multiplexing is used, all the elements of the information vectors have different values because different signals are multiplexed and transmitted. In contrast, if the spatial diversity is used, all the elements of the information vector s have the same value because the same signals are transmitted through several channel paths.

A method of mixing spatial multiplexing and the spatial diversity may be taken into consideration. In other words, the same signals may be transmitted using the spatial diversity through 3 transmission antennas, for example, and the remaining different signals may be spatially multiplexed and transmitted.

If N_R reception antennas are present, the reception signals y_1, y_2, ..., y_NR of the respective antennas are represented as follows using a vector y.

$$y=[y_1, y_2, \ldots, y_{N_R}]^T \quad \text{[Equation 6]}$$

Meanwhile, if channels in a multi-input/output antenna communication system are modeled, the channels may be classified according to transmission/reception antenna indices. A channel passing through a reception antenna i from a transmission antenna j is represented as h_ij. In this case, it is to be noted that in order of the index of h_ij, the index of a reception antenna comes first and the index of a transmission antenna then comes.

Several channels may be grouped and expressed in a vector and matrix form. For example, a vector expression is described below.

Figure 6:
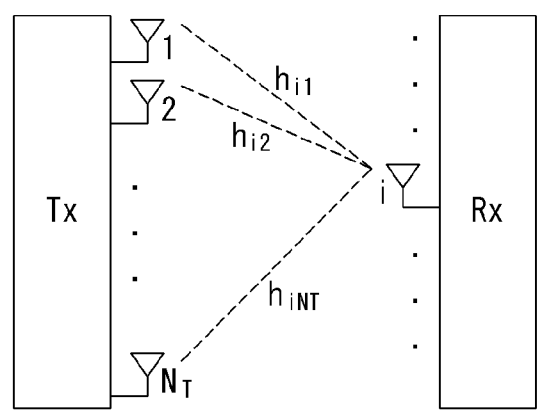
FIG. 6 is a diagram showing a channel from a plurality of transmission antennas to a single reception antenna.

FIG. 6 is a diagram showing a channel from a plurality of transmission antennas to a single reception antenna.

As shown in FIG. 6, a channel from a total of N_T transmission antennas to a reception antenna i may be represented as follows.

$$h_i^T = [h_{i1}, h_{i2}, \ldots, h_{iN_T}] \quad \text{[Equation 7]}$$

Furthermore, if all channels from the N_T transmission antenna to NR reception antennas are represented through a matrix expression, such as Equation 7, they may be represented as follows.

$$H = \begin{bmatrix} h_1^T \\ h_2^T \\ \vdots \\ h_i^T \\ \vdots \\ h_{N_R}^T \end{bmatrix} = \begin{bmatrix} h_{11} & h_{12} & \cdots & h_{1N_T} \\ h_{21} & h_{22} & \cdots & h_{2N_T} \\ \vdots & & \ddots & \\ h_{i1} & h_{i2} & \cdots & h_{iN_T} \\ \vdots & & & \ddots \\ h_{N_R 1} & h_{N_R 2} & \cdots & h_{N_R N_T} \end{bmatrix} \quad \text{[Equation 8]}$$

Meanwhile, Additive White Gaussian Noise (AWGN) is added to an actual channel after the actual channel experiences the channel matrix H. Accordingly, AWGN n_1, n_2, ..., n_NR added to the N_R reception antennas, respectively, are represented using a vector as follows.

$$n=[n_1, n_2, \ldots, n_{N_R}]^T \quad \text{[Equation 9]}$$

A transmission signal, a reception signal, a channel, and AWGN in a multi-input/output antenna communication system may be represented to have the following relationship through the modeling of the transmission signal, reception signal, channel, and AWGN, such as those described above.

$$y = \begin{bmatrix} y_1 \\ y_2 \\ \vdots \\ y_i \\ \vdots \\ y_{N_R} \end{bmatrix} = \begin{bmatrix} h_{11} & h_{12} & \cdots & h_{1N_T} \\ h_{21} & h_{22} & \cdots & h_{2N_T} \\ \vdots & & \ddots & \\ h_{i1} & h_{i2} & \cdots & h_{iN_T} \\ \vdots & & & \ddots \\ h_{N_R 1} & h_{N_R 2} & \cdots & h_{N_R N_T} \end{bmatrix} \begin{bmatrix} x_1 \\ x_2 \\ \vdots \\ x_j \\ \vdots \\ x_{N_T} \end{bmatrix} + \begin{bmatrix} n_1 \\ n_2 \\ \vdots \\ n_i \\ \vdots \\ n_{N_R} \end{bmatrix} = \quad \text{[Equation 10]}$$

$$Hx + n$$

Meanwhile, the number of rows and columns of the channel matrix H indicative of the state of channels is determined by the number of transmission/reception antennas. In the channel matrix H, as described above, the number of rows becomes equal to the number of reception antennas N_R, and the number of columns becomes equal to the number of transmission antennas N_T. That is, the channel matrix H becomes an N_R×N_T matrix.

In general, the rank of a matrix is defined as a minimum number of the number of independent rows or columns. Accordingly, the rank of the matrix is not greater than the number of rows or columns. As for figural style, for example, the rank H of the channel matrix H is limited as follows.

$$\text{rank}(H) \leq \min(N_T, N_R) \quad \text{[Equation 11]}$$

Furthermore, if a matrix is subjected to Eigen value decomposition, a rank may be defined as the number of Eigen values that belong to Eigen values and that are not 0. Likewise, if a rank is subjected to Singular Value Decomposition (SVD), it may be defined as the number of singular values other than 0. Accordingly, the physical meaning of a rank in a channel matrix may be said to be a maximum number on which different information may be transmitted in a given channel.

In this specification, "rank" for MIMO transmission indicates the number of paths through which signals may be independently transmitted at a specific point of time and a specific frequency resource. The "number of layers" indicates the number of signal streams transmitted through each path. In general, a rank has the same meaning as the number of layers unless otherwise described because a transmission end sends the number of layers corresponding to the number of ranks used in signal transmission.

Hereinafter, in relation to the MIMO transport techniques described above, a codebook-based precoding technique will be described in detail.

Figure 7:
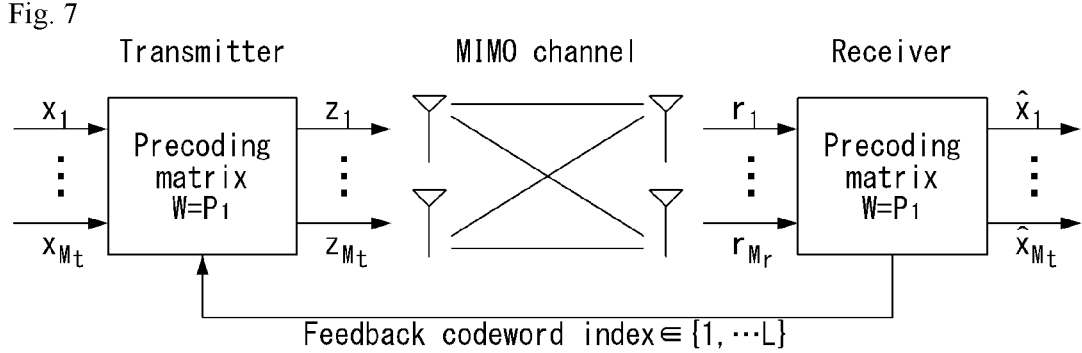
FIG. 7 is a diagram for describing a basic concept of a codebook-based precoding in a wireless communication system to which the present invention may be applied.

FIG. 7 is a diagram for describing a basic concept of a codebook-based precoding in a wireless communication system to which the present invention may be applied.

According to the codebook-based precoding technique, a transmitting-end and a receiving end share codebook information that includes a predetermined number of precoding matrixes according to a transmission rank, the number of antennas, and so on.

That is, in the case that feedback information is finite, the precoding-based codebook technique may be used.

A receiving-end may measure a channel state through a receiving signal, and may feedback a finite number of preferred matrix information (i.e., index of the corresponding precoding matrix) based on the codebook information described above. For example, a receiving-end may measure a signal in Maximum Likelihood (ML) or Minimum Mean Square Error (MMSE) technique, and may select an optimal precoding matrix.

FIG. 7 shows that a receiving-end transmits the precoding matrix information for each codeword to a transmitting-end, but the present invention is not limited thereto.

The transmitting-end that receives the feedback information from the receiving-end may select a specific precoding matrix from the codebook based on the received information. The transmitting-end that selects the precoding matrix may perform precoding in a manner of multiplying layer signals, of which number amounts to a transmission rank, by the selected precoding matrix and may transmit the precoded transmission signal via a plurality of antennas. The number of rows in a precoding matrix is equal to the number of antennas, while the number of columns is equal to a rank value. Since the rank value is equal to the number of layers, the number of the columns is equal to the number of the layers. For instance, when the number of transmitting antennas and the number of layers are 4 and 2, respectively, a precoding matrix may include 4×2 matrix. Equation 12 below represents an operation of mapping information mapped to each layer to a respective antenna through the precoding matrix in the case.

$$\begin{bmatrix} y_1 \\ y_2 \\ y_3 \\ y_4 \end{bmatrix} = \begin{bmatrix} p_{11} & y_1 \\ p_{12} & y_1 \\ p_{13} & y_1 \\ p_{14} & y_1 \end{bmatrix} \cdot \begin{bmatrix} x_1 \\ x_2 \end{bmatrix} \quad \text{[Equation 12]}$$

Referring to Equation 12, information mapped to a layer includes x1 and x2 and each element pij of 4×2 matrix is a weight used for precoding. y1, y2, y3 and y4 indicate information mapped to antennas and may be transmitted via corresponding antennas by OFDM transmission schemes, respectively.

The receiving-end that receives the signal precoded and transmitted in the transmitting-end may reconstruct the received signal by performing inverse processing of the precoding performed in the transmitting-end. Generally, since a precoding matrix satisfies such a unitary matrix (U) condition as 'U*UH=I' (herein, U^H means an Hermit matrix of matrix U), the above-mentioned inverse processing of the precoding may be performed in a manner of multiplying the received signal by Hermit matrix PH of the precoding matrix P used for the precoding performed by the transmitting-end.

In addition, since the precoding is requested to have good performance for antenna configurations of various types, it may be necessary to consider performance for various antenna configurations in codebook design. In the following description, an exemplary configuration of multiple antennas is explained.

In the conventional 3GPP LTE system (e.g., system according to 3GPP LTE Release-8 or Release-9 Standard), since maximum four transmission antennas are supported in DL, a codebook for four transmission antennas is designed. In the 3GPP LTE-A system evolved from the conventional 3GPP LTE system, maximum eight transmission antennas may be supported in DL. Accordingly, it may be necessary to design a precoding codebook that provides good performance for a DL transmission via maximum eight transmission antennas.

Moreover, when a codebook is designed, generally required are constant modulus property, finite alphabet, restriction on a codebook size, nested property, and providing good performance for various antenna configurations.

The constant modulus property means a property that amplitude of each channel component of a precoding matrix configuring a codebook is constant. According to this property, no matter what kind of a precoding matrix is used, power levels transmitted from all antennas may be maintained equal to each other. Hence, it may be able to raise efficiency in using a power amplifier.

The finite alphabet means to configure precoding matrixes using quadrature phase shift keying (QPSK) alphabet (i.e., ±1, ±j) only except a scaling factor in the case of two transmitting antennas, for example. Accordingly, when multiplication is performed on a precoding matrix by a precoder, it may alleviate the complexity of calculation.

The codebook size may be restricted as a predetermined size or smaller. Since a size of a codebook increases, precoding matrixes for various cases may be included in the codebook, and accordingly, a channel status may be more accurately reflected. However, the number of bits of a precoding matrix indicator (PMI) correspondingly increases to cause signaling overhead.

The nested property means that a portion of a high rank precoding matrix is configured with a low rank precoding matrix. Thus, when the corresponding precoding matrix is configured, an appropriate performance may be guaranteed even in the case that a BS determines to perform a DL transmission of a transmission rank lower than a channel rank indicated by a rank indicator (RI) reported from a UE. In addition, according to this property, complexity of channel quality information (CQI) calculation may be reduced. This is because calculation for a precoding matrix selection may be shared in part when an operation of selecting a precoding matrix from precoding matrixes designed for different ranks is performed.

Providing good performance for various antenna configurations may mean that providing performance over a predetermined level is required for various cases including a low correlated antenna configuration, a high correlated antenna configuration, a cross-polarized antenna configuration and the like.

Reference Signal (RS)

In a wireless communication system, a signal may be distorted during transmission because data is transmitted through a radio channel. In order for a reception end to accurately receive a distorted signal, the distortion of a received signal needs to be corrected using channel information. In order to detect channel information, a method of detecting channel information using the degree of the distortion of a signal transmission method and a signal known to both the transmission side and the reception side when they are transmitted through a channel is chiefly used. The aforementioned signal is called a pilot signal or reference signal (RS).

Furthermore recently, when most of mobile communication systems transmit a packet, they use a method capable of improving transmission/reception data efficiency by adopting multiple transmission antennas and multiple reception antennas instead of using one transmission antenna and one reception antenna used so far. When data is transmitted and received using multiple input/output antennas, a channel state between the transmission antenna and the reception antenna must be detected in order to accurately receive the signal. Accordingly, each transmission antenna must have an individual reference signal.

In a mobile communication system, an RS may be basically divided into two types depending on its object. There are an RS having an object of obtaining channel state information and an RS used for data demodulation. The former has an object of obtaining, by a UE, to obtain channel state information in the downlink. Accordingly, a corresponding RS must be transmitted in a wideband, and a UE must be capable of receiving and measuring the RS although the UE does not receive downlink data in a specific subframe. Furthermore, the former is also used for radio resources management (RRM) measurement, such as handover. The latter is an RS transmitted along with corresponding resources when an eNB transmits the downlink. A UE may perform channel estimation by receiving a corresponding RS and thus may demodulate data. The corresponding RS must be transmitted in a region in which data is transmitted.

A downlink RS includes one common RS (CRS) for the acquisition of information about a channel state shared by all of UEs within a cell and measurement, such as handover, and a dedicated RS (DRS) used for data demodulation for only a specific UE. Information for demodulation and channel measurement can be provided using such RSs. That is, the DRS is used for only data demodulation, and the CRS is used for the two objects of channel information acquisition and data demodulation.

The reception side (i.e., UE) measures a channel state based on a CRS and feeds an indicator related to channel quality, such as a channel quality indicator (CQI), a precoding matrix index (PMI) and/or a rank indicator (RI), back to the transmission side (i.e., an eNB). The CRS is also called a cell-specific RS. In contrast, a reference signal related to the feedback of channel state information (CSI) may be defined as a CSI-RS.

The DRS may be transmitted through resource elements if data on a PDSCH needs to be demodulated. A UE may receive information about whether a DRS is present through a higher layer, and the DRS is valid only if a corresponding PDSCH has been mapped. The DRS may also be called a UE-specific RS or demodulation RS (DMRS).

Figure 8:
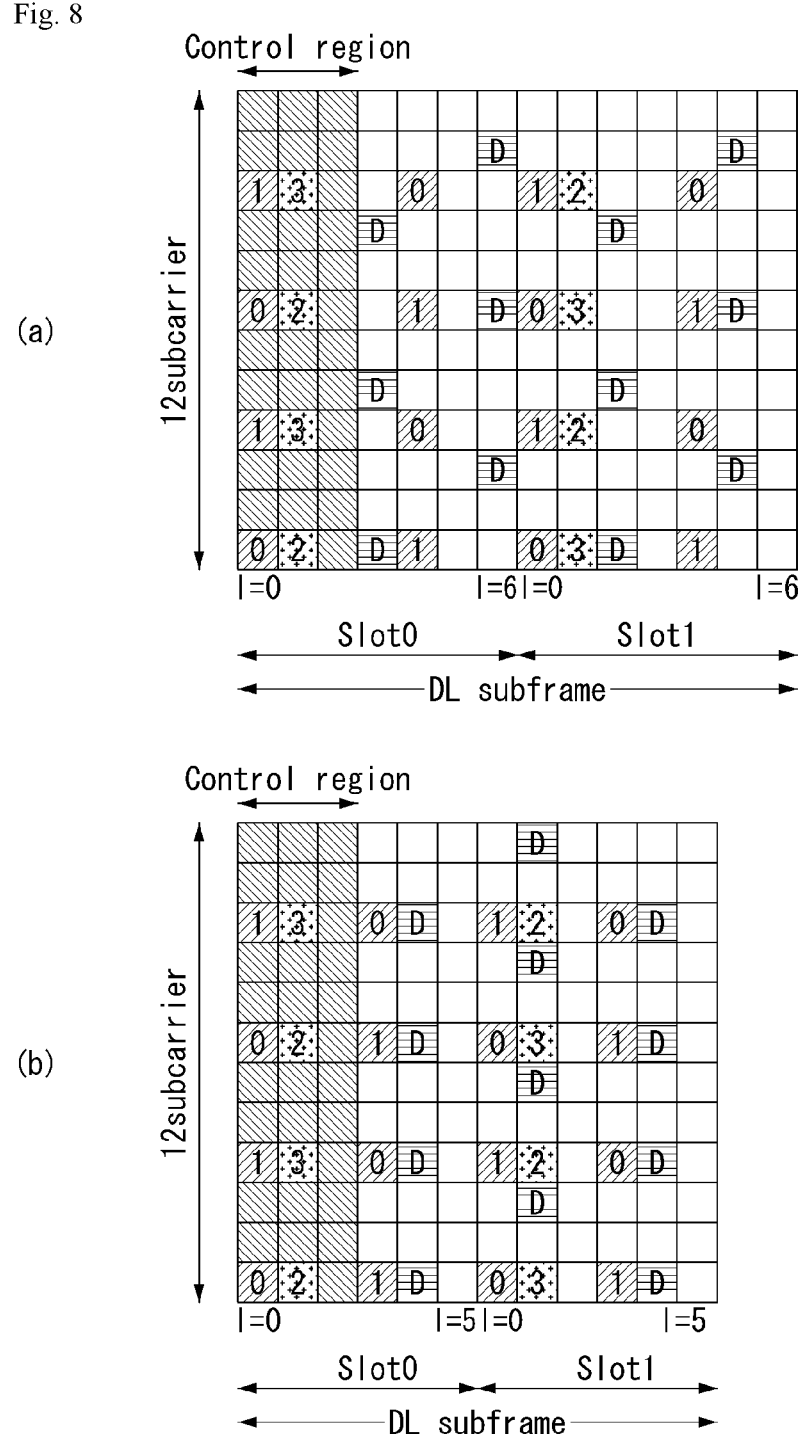
FIG. 8 illustrates reference signal patterns mapped to downlink resource block pairs in a wireless communication system to which the present invention may be applied.

FIG. 8 illustrates reference signal patterns mapped to downlink resource block pairs in a wireless communication system to which the present invention may be applied.

Referring to FIG. 8, a downlink resource block pair, that is, a unit in which a reference signal is mapped, may be represented in the form of one subframe in a time domain X 12 subcarriers in a frequency domain. That is, in a time axis (an x axis), one resource block pair has a length of 14 OFDM symbols in the case of a normal cyclic prefix (CP) (FIG. 8a) and has a length of 12 OFDM symbols in the case of an extended cyclic prefix (CP) (FIG. 8b). In the resource block lattice, resource elements (REs) indicated by "0", "1", "2", and "3" mean the locations of the CRSs of antenna port indices "0", "1", "2", and "3", respectively, and REs indicated by "D" mean the location of a DRS.

A CRS is described in more detail below. The CRS is a reference signal which is used to estimate the channel of a physical antenna and may be received by all UEs located within a cell in common. The CRS is distributed to a full frequency bandwidth. That is, the CRS is cell-specific signal and is transmitted every subframe in a wideband. Furthermore, the CRS may be used for channel quality information (CSI) and data demodulation.

A CRS is defined in various formats depending on an antenna array on the transmitting side (eNB). In the 3GPP LTE system (e.g., Release-8), an RS for a maximum four antenna ports is transmitted depending on the number of transmission antennas of an eNB. The side from which a downlink signal is transmitted has three types of antenna arrays, such as a single transmission antenna, two transmission antennas and four transmission antennas. For example, if the number of transmission antennas of an eNB is two, CRSs for a No. 0 antenna port and a No. 1 antenna port are transmitted. If the number of transmission antennas of an eNB is four, CRSs for No. 0~No. 3 antenna ports are transmitted. If the number of transmission antennas of an eNB is four, a CRS pattern in one RB is shown in FIG. 8.

If an eNB uses a single transmission antenna, reference signals for a single antenna port are arrayed.

If an eNB uses two transmission antennas, reference signals for two transmission antenna ports are arrayed using a time division multiplexing (TDM) scheme and/or a frequency division multiplexing (FDM) scheme. That is, different time resources and/or different frequency resources are allocated in order to distinguish between reference signals for two antenna ports.

Furthermore, if an eNB uses four transmission antennas, reference signals for four transmission antenna ports are arrayed using the TDM and/or FDM schemes. Channel information measured by the reception side (i.e., UE) of a downlink signal may be used to demodulate data transmitted using a transmission scheme, such as single transmission antenna transmission, transmission diversity, closed-loop spatial multiplexing, open-loop spatial multiplexing or a multi-user-multi-input/output (MIMO) antenna.

If a multi-input multi-output antenna is supported, when a RS is transmitted by a specific antenna port, the RS is transmitted in the locations of resource elements specified depending on a pattern of the RS and is not transmitted in the locations of resource elements specified for other antenna ports. That is, RSs between different antennas do not overlap.

A DRS is described in more detail below. The DRS is used to demodulate data. In multi-input multi-output antenna transmission, precoding weight used for a specific UE is combined with a transmission channel transmitted by each transmission antenna when the UE receives an RS, and is used to estimate a corresponding channel without any change.

A 3GPP LTE system (e.g., Release-8) supports a maximum of four transmission antennas, and a DRS for rank 1 beamforming is defined. The DRS for rank 1 beamforming also indicates an RS for an antenna port index 5.

In an LTE-A system, that is, an advanced and developed form of the LTE system, the design is necessary to support a maximum of eight transmission antennas in the downlink of an eNB. Accordingly, RSs for the maximum of eight transmission antennas must be also supported. In the LTE system, only downlink RSs for a maximum of four antenna ports has been defined. Accordingly, if an eNB has four to a maximum of eight downlink transmission antennas in the LTE-A system, RSs for these antenna ports must be additionally defined and designed. Regarding the RSs for the maximum of eight transmission antenna ports, the aforementioned RS for channel measurement and the aforementioned RS for data demodulation must be designed.

One of important factors that must be considered in designing an LTE-A system is backward compatibility, that is, that an LTE UE must well operate even in the LTE-A system, which must be supported by the system. From an RS transmission viewpoint, in the time-frequency domain in which a CRS defined in LTE is transmitted in a full band every subframe, RSs for a maximum of eight transmission antenna ports must be additionally defined. In the LTE-A system, if an RS pattern for a maximum of eight transmission antennas is added in a full band every subframe using the same method as the CRS of the existing LTE, RS overhead is excessively increased.

Accordingly, the RS newly designed in the LTE-A system is basically divided into two types, which include an RS having a channel measurement object for the selection of MCS or a PMI (channel state information-RS or channel state indication-RS (CSI-RS)) and an RS for the demodulation of data transmitted through eight transmission antennas (data demodulation-RS (DM-RS)).

The CSI-RS for the channel measurement object is characterized in that it is designed for an object focused on channel measurement unlike the existing CRS used for objects for measurement, such as channel measurement and handover, and for data demodulation. Furthermore, the CSI-RS may also be used for an object for measurement, such as handover. The CSI-RS does not need to be transmitted every subframe unlike the CRS because it is transmitted for an object of obtaining information about a channel state. In order to reduce overhead of a CSI-RS, the CSI-RS is intermittently transmitted on the time axis.

For data demodulation, a DM-RS is dedicatedly transmitted to a UE scheduled in a corresponding time-frequency domain. That is, a DM-RS for a specific UE is transmitted only in a region in which the corresponding UE has been scheduled, that is, in the time-frequency domain in which data is received.

In the LTE-A system, a maximum of eight transmission antennas are supported in the downlink of an eNB. In the LTE-A system, if RSs for a maximum of eight transmission antennas are transmitted in a full band every subframe using the same method as the CRS in the existing LTE, RS overhead is excessively increased. Accordingly, in the LTE-A system, an RS has been separated into the CSI-RS of the CSI measurement object for the selection of MCS or a PMI and the DM-RS for data demodulation, and thus the two RSs have been added. The CSI-RS may also be used for an object, such as RRM measurement, but has been designed for a main object for the acquisition of CSI. The CSI-RS does not need to be transmitted every subframe because it is not used for data demodulation. Accordingly, in order to reduce overhead of the CSI-RS, the CSI-RS is intermittently transmitted on the time axis. That is, the CSI-RS has a period corresponding to a multiple of the integer of one subframe and may be periodically transmitted or transmitted in a specific transmission pattern. In this case, the period or pattern in which the CSI-RS is transmitted may be set by an eNB.

For data demodulation, a DM-RS is dedicatedly transmitted to a UE scheduled in a corresponding time-frequency domain. That is, a DM-RS for a specific UE is transmitted only in the region in which scheduling is performed for the corresponding UE, that is, only in the time-frequency domain in which data is received.

In order to measure a CSI-RS, a UE must be aware of information about the transmission subframe index of the CSI-RS for each CSI-RS antenna port of a cell to which the UE belongs, the location of a CSI-RS resource element (RE) time-frequency within a transmission subframe, and a CSI-RS sequence.

In the LTE-A system, an eNB has to transmit a CSI-RS for each of a maximum of eight antenna ports. Resources used for the CSI-RS transmission of different antenna ports must be orthogonal. When one eNB transmits CSI-RSs for different antenna ports, it may orthogonally allocate the resources according to the FDM/TDM scheme by mapping the CSI-RSs for the respective antenna ports to different REs. Alternatively, the CSI-RSs for different antenna ports may be transmitted according to the CDM scheme for mapping the CSI-RSs to pieces of code orthogonal to each other.

When an eNB notifies a UE belonging to the eNB of information on a CSI-RS, first, the eNB must notify the UE of information about a time-frequency in which a CSI-RS for each antenna port is mapped. Specifically, the information includes subframe numbers in which the CSI-RS is transmitted or a period in which the CSI-RS is transmitted, a subframe offset in which the CSI-RS is transmitted, an OFDM symbol number in which the CSI-RS RE of a specific antenna is transmitted, frequency spacing, and the offset or shift value of an RE in the frequency axis.

A CSI-RS is transmitted through one, two, four or eight antenna ports. Antenna ports used in this case are p=15, p=15, 16, p=15, ..., 18, and p=15, ..., 22, respectively. A CSI-RS may be defined for only a subcarrier spacing Δf=15 kHz.

In a subframe configured for CSI-RS transmission, a CSI-RS sequence is mapped to a complex-valued modulation symbol a_k,l^(p) used as a reference symbol on each antenna port p as in Equation 13.

$$a_{k,l}^{(p)} = w_{l''} \cdot r_{l,n_s}(m') \quad \text{[Equation 13]}$$

$$k = k' + 12m +$$

$$\begin{cases} -0 & \text{for } p \in \{15, 16\}, \text{ normal cyclic prefix} \\ -6 & \text{for } p \in \{17, 18\}, \text{ normal cyclic prefix} \\ -1 & \text{for } p \in \{19, 20\}, \text{ normal cyclic prefix} \\ -7 & \text{for } p \in \{21, 22\}, \text{ normal cyclic prefix} \\ -0 & \text{for } p \in \{15, 16\}, \text{ extended cyclic prefix} \\ -3 & \text{for } p \in \{17, 18\}, \text{ extended cyclic prefix} \\ -6 & \text{for } p \in \{19, 20\}, \text{ extended cyclic prefix} \\ -9 & \text{for } p \in \{21, 22\}, \text{ extended cyclic prefix} \end{cases}$$

$$l = l' +$$

$$\begin{cases} l'' & \text{CSI reference signal configurations 0-19,} \\ & \text{normal cyclic prefix} \\ 2l'' & \text{CSI reference signal configurations 20-31,} \\ & \text{normal cyclic prefix} \\ l'' & \text{CSI reference signal configurations 0-27,} \\ & \text{extended cyclic prefix} \end{cases}$$

$$w_{l''} = \begin{cases} 1 & p \in \{15, 17, 19, 21\} \\ (-1)^{l''} & p \in \{16, 18, 20, 22\} \end{cases}$$

$$l'' = 0, 1$$

$$m = 0, 1, \ldots, N_{RB}^{DL} - 1$$

$$m' = m + \left\lfloor \frac{N_{RB}^{max,DL} - N_{RB}^{DL}}{2} \right\rfloor$$

In Equation 13, (k',l') (wherein k' is a subcarrier index within a resource block and l' indicates an OFDM symbol index within a slot.) and the condition of n_s is determined depending on a CSI-RS configuration, such as Table 3 or Table 4.

Table 3 illustrates the mapping of (k',l') from a CSI-RS configuration in a normal CP.

TABLE 3

| | CSI reference signal configuration | Number of CSI reference signals configured | | | | | |
|---|---|---|---|---|---|---|---|
| | | 1 or 2 | | 4 | | 8 | |
| | | (k', l') | n_s mod 2 | (k', l') | n_s mod 2 | (k', l') | n_s mod 2 |
| Frame structure type 1 and 2 | 0 | (9, 5) | 0 | (9, 5) | 0 | (9, 5) | 0 |
| | 1 | (11, 2) | 1 | (11, 2) | 1 | (11, 2) | 1 |
| | 2 | (9, 2) | 1 | (9, 2) | 1 | (9, 2) | 1 |
| | 3 | (7, 2) | 1 | (7, 2) | 1 | (7, 2) | 1 |
| | 4 | (9, 5) | 1 | (9, 5) | 1 | (9, 5) | 1 |
| | 5 | (8, 5) | 0 | (8, 5) | 0 | | |
| | 6 | (10, 2) | 1 | (10, 2) | 1 | | |
| | 7 | (8, 2) | 1 | (8, 2) | 1 | | |
| | 8 | (6, 2) | 1 | (6, 2) | 1 | | |
| | 9 | (8, 5) | 1 | (8, 5) | 1 | | |
| | 10 | (3, 5) | 0 | | | | |
| | 11 | (2, 5) | 0 | | | | |
| | 12 | (5, 2) | 1 | | | | |
| | 13 | (4, 2) | 1 | | | | |
| | 14 | (3, 2) | 1 | | | | |
| | 15 | (2, 2) | 1 | | | | |
| | 16 | (1, 2) | 1 | | | | |
| | 17 | (0, 2) | 1 | | | | |
| | 18 | (3, 5) | 1 | | | | |
| | 19 | (2, 5) | 1 | | | | |
| Frame structure type 2 only | 20 | (11, 1) | 1 | (11, 1) | 1 | (11, 1) | 1 |
| | 21 | (9, 1) | 1 | (9, 1) | 1 | (9, 1) | 1 |
| | 22 | (7, 1) | 1 | (7, 1) | 1 | (7, 1) | 1 |
| | 23 | (10, 1) | 1 | (10, 1) | 1 | | |
| | 24 | (8, 1) | 1 | (8, 1) | 1 | | |
| | 25 | (6, 1) | 1 | (6, 1) | 1 | | |
| | 26 | (5, 1) | 1 | | | | |
| | 27 | (4, 1) | 1 | | | | |
| | 28 | (3, 1) | 1 | | | | |
| | 29 | (2, 1) | 1 | | | | |
| | 30 | (1, 1) | 1 | | | | |
| | 31 | (0, 1) | 1 | | | | |

Table 4 illustrates the mapping of (k',l') from a CSI-RS configuration in an extended CP.

TABLE 4

| | CSI reference signal configuration | Number of CSI reference signals configured | | | | | |
|---|---|---|---|---|---|---|---|
| | | 1 or 2 | | 4 | | 8 | |
| | | (k', l') | $n_s$ mod 2 | (k', l') | $n_s$ mod 2 | (k', l') | $n_s$ mod 2 |
| Frame structure type 1 and 2 | 0 | (11, 4) | 0 | (11, 4) | 0 | (11, 4) | 0 |
| | 1 | (9, 4) | 0 | (9, 4) | 0 | (9, 4) | 0 |
| | 2 | (10, 4) | 1 | (10, 4) | 1 | (10, 4) | 1 |
| | 3 | (9, 4) | 1 | (9, 4) | 1 | (9, 4) | 1 |
| | 4 | (5, 4) | 0 | (5, 4) | 0 | | |
| | 5 | (3, 4) | 0 | (3, 4) | 0 | | |
| | 6 | (4, 4) | 1 | (4, 4) | 1 | | |
| | 7 | (3, 4) | 1 | (3, 4) | 1 | | |
| | 8 | (8, 4) | 0 | | | | |
| | 9 | (6, 4) | 0 | | | | |
| | 10 | (2, 4) | 0 | | | | |
| | 11 | (0, 4) | 0 | | | | |
| | 12 | (7, 4) | 1 | | | | |
| | 13 | (6, 4) | 1 | | | | |
| | 14 | (1, 4) | 1 | | | | |
| | 15 | (0, 4) | 1 | | | | |
| Frame structure type 2 only | 16 | (11, 1) | 1 | (11, 1) | 1 | (11, 1) | 1 |
| | 17 | (10, 1) | 1 | (10, 1) | 1 | (10, 1) | 1 |
| | 18 | (9, 1) | 1 | (9, 1) | 1 | (9, 1) | 1 |
| | 19 | (5, 1) | 1 | (5, 1) | 1 | | |
| | 20 | (4, 1) | 1 | (4, 1) | 1 | | |
| | 21 | (3, 1) | 1 | (3, 1) | 1 | | |
| | 22 | (8, 1) | 1 | | | | |
| | 23 | (7, 1) | 1 | | | | |
| | 24 | (6, 1) | 1 | | | | |
| | 25 | (2, 1) | 1 | | | | |
| | 26 | (1, 1) | 1 | | | | |
| | 27 | (0, 1) | 1 | | | | |

Referring to Table 3 and Table 4, in the transmission of a CSI-RS, in order to reduce inter-cell interference (ICI) in a multi-cell environment including a heterogeneous network (HetNet) environment, a maximum of 32 different configurations (in the case of a normal CP) or a maximum of 28 different configurations (in the case of an extended CP) are defined.

The CSI-RS configuration is different depending on the number of antenna ports and a CP within a cell, and a neighboring cell may have a maximum of different configurations. Furthermore, the CSI-RS configuration may be divided into a case where it is applied to both an FDD frame and a TDD frame and a case where it is applied to only a TDD frame depending on a frame structure.

(k',l') and n_s are determined depending on a CSI-RS configuration based on Table 3 and Table 4, and time-frequency resources used for CSI-RS transmission are determined depending on each CSI-RS antenna port.

Figure 9:
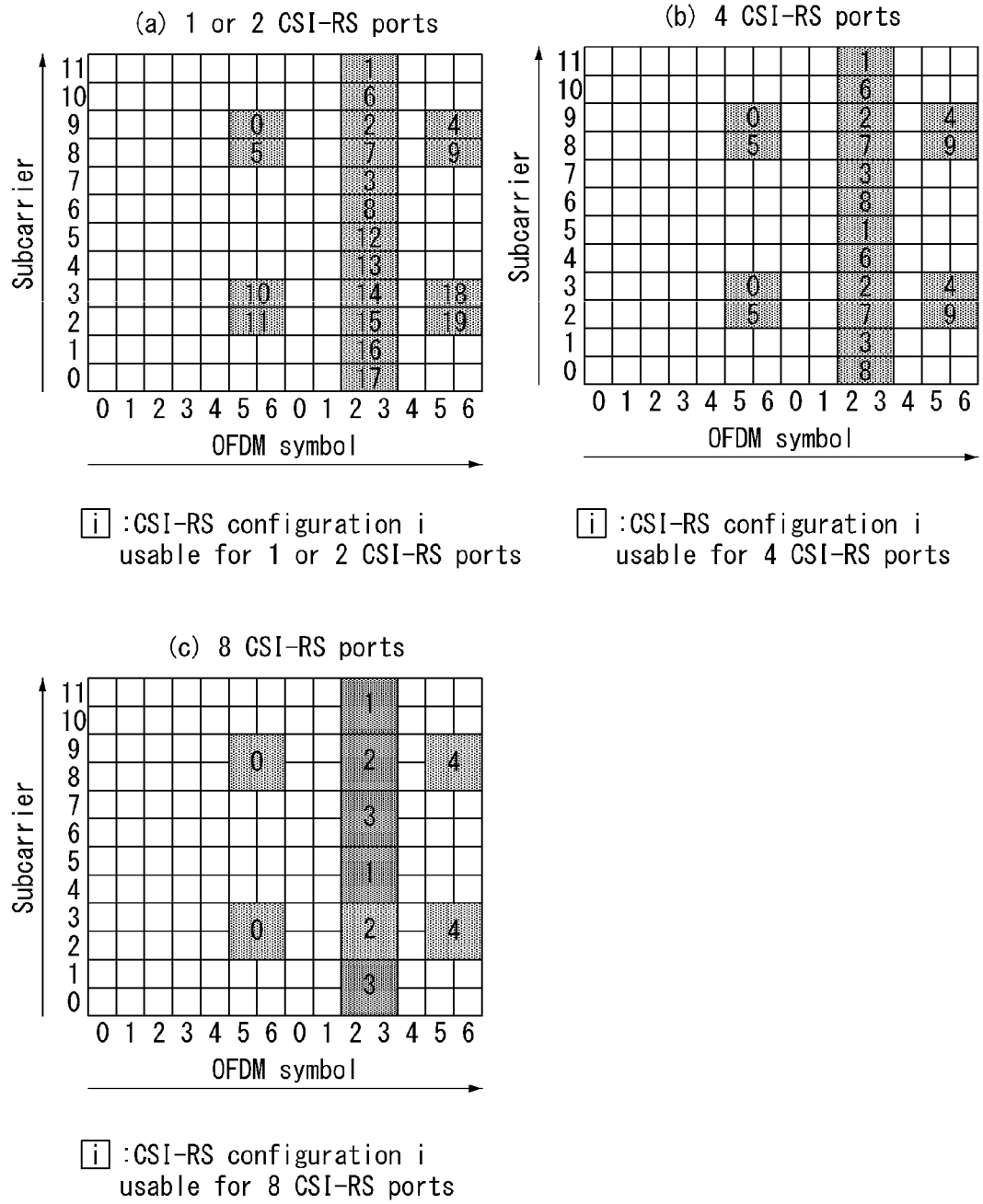
FIG. 9 is a diagram illustrating resources to which reference signals are mapped in a wireless communication system to which the present invention may be applied.

FIG. 9 is a diagram illustrating resources to which reference signals are mapped in a wireless communication system to which the present invention may be applied.

FIG. 9(a) shows twenty types of CSI-RS configurations available for CSI-RS transmission by one or two CSI-RS antenna ports, FIG. 9(b) shows ten types of CSI-RS configurations available for four CSI-RS antenna ports, and FIG. 9(c) shows five types of CSI-RS configurations available for eight CSI-RS antenna ports.

As described above, radio resources (i.e., an RE pair) in which a CSI-RS is transmitted are determined depending on each CSI-RS configuration.

If one or two antenna ports are configured for CSI-RS transmission with respect to a specific cell, the CSI-RS is transmitted on radio resources on a configured CSI-RS configuration of the twenty types of CSI-RS configurations shown in FIG. 9(a).

Likewise, when four antenna ports are configured for CSI-RS transmission with respect to a specific cell, a CSI-RS is transmitted on radio resources on a configured CSI-RS configuration of the ten types of CSI-RS configurations shown in FIG. 9(b). Furthermore, when eight antenna ports are configured for CSI-RS transmission with respect to a specific cell, a CSI-RS is transmitted on radio resources on a configured CSI-RS configuration of the five types of CSI-RS configurations shown in FIG. 9(c).

A CSI-RS for each antenna port is subjected to CDM for every two antenna ports (i.e., {15,16}, {17,18}, {19,20} and {21,22}) on the same radio resources and transmitted. For example, in the case of antenna ports 15 and 16, CSI-RS complex symbols for the respective antenna ports 15 and 16 are the same, but are multiplied by different types of orthogonal code (e.g., Walsh code) and mapped to the same radio resources. The complex symbol of the CSI-RS for the antenna port 15 is multiplied by [1, 1], and the complex symbol of the CSI-RS for the antenna port 16 is multiplied by [1 −1] and mapped to the same radio resources. The same is true of the antenna ports {17,18}, {19,20} and {21,22}.

A UE may detect a CSI-RS for a specific antenna port by multiplying code by which a transmitted symbol has been multiplied. That is, a transmitted symbol is multiplied by the code [1 1] multiplied in order to detect the CSI-RS for the antenna port 15, and a transmitted symbol is multiplied by the code [1 −1] multiplied in order to detect the CSI-RS for the antenna port 16.

Referring to FIGS. 9(a) to 9(c), in the case of the same CSI-RS configuration index, radio resources according to a CSI-RS configuration having a large number of antenna ports include radio resources having a small number of CSI-RS antenna ports. For example, in the case of a CSI-RS configuration 0, radio resources for the number of eight antenna ports include both radio resources for the number of four antenna ports and radio resources for the number of one or two antenna ports.

A plurality of CSI-RS configurations may be used in one cell. 0 or one CSI-RS configuration may be used for a non-zero power (NZP) CSI-RS, and 0 or several CSI-RS configurations may be used for a zero power (ZP) CSI-RS.

For each bit set to 1 in a zeropower (ZP) CSI-RS ('ZeroPowerCSI-RS') that is a bitmap of 16 bits configured by a high layer, a UE assumes zero transmission power in REs (except a case where an RE overlaps an RE assuming a NZP CSI-RS configured by a high layer) corresponding to the four CSI-RS columns of Table 3 and Table 4. The most significant bit (MSB) corresponds to the lowest CSI-RS configuration index, and next bits in the bitmap sequentially correspond to next CSI-RS configuration indices.

A CSI-RS is transmitted only in a downlink slot that satisfies the condition of (n_s mod 2) in Table 3 and Table 4 and a subframe that satisfies the CSI-RS subframe configurations.

In the case of the frame structure type 2 (TDD), a CSI-RS is not transmitted in a special subframe, a synchronization signal (SS), a subframe colliding against a PBCH or SystemInformationBlockType1 (SIB 1) Message transmission or a subframe configured to paging message transmission.

Furthermore, an RE in which a CSI-RS for any antenna port belonging to an antenna port set S (S={15}, S={15,16}, S={17,18}, S={19,20} or S={21,22}) is transmitted is not used for the transmission of a PDSCH or for the CSI-RS transmission of another antenna port.

Time-frequency resources used for CSI-RS transmission cannot be used for data transmission. Accordingly, data throughput is reduced as CSI-RS overhead is increased. By considering this, a CSI-RS is not configured to be transmitted every subframe, but is configured to be transmitted in each transmission period corresponding to a plurality of subframes. In this case, CSI-RS transmission overhead can be significantly reduced compared to a case where a CSI-RS is transmitted every subframe.

A subframe period (hereinafter referred to as a "CSI transmission period") T_CSI-RS and a subframe offset Δ_CSI-RS for CSI-RS transmission are shown in Table 5.

Table 5 illustrates CSI-RS subframe configurations.

TABLE 5

| CSI-RS-SubframeConfig $I_{CSI-RS}$ | CSI-RS periodicity $T_{CSI-RS}$ (subframes) | CSI-RS subframe offset $\Delta_{CSI-RS}$ (subframes) |
|---|---|---|
| 0-4 | 5 | $I_{CSI-RS}$ |
| 5-14 | 10 | $I_{CSI-RS}$ − 5 |
| 15-34 | 20 | $I_{CSI-RS}$ − 15 |
| 35-74 | 40 | $I_{CSI-RS}$ − 35 |
| 75-154 | 80 | $I_{CSI-RS}$ − 75 |

Referring to Table 5, the CSI-RS transmission period T_CSI-RS and the subframe offset Δ_CSI-RS are determined depending on the CSI-RS subframe configuration I_CSI-RS.

The CSI-RS subframe configuration of Table 5 may be configured as one of the aforementioned 'SubframeConfig' field and 'zeroTxPowerSubframeConfig' field. The CSI-RS subframe configuration may be separately configured with respect to an NZP CSI-RS and a ZP CSI-RS.

A subframe including a CSI-RS satisfies Equation 14.

$$(10n_f + \lfloor n_s/2 \rfloor - \Delta_{CSI-RS}) \bmod T_{CSI-RS} = 0 \quad \text{[Equation 14]}$$

In Equation 13, T_CSI-RS means a CSI-RS transmission period, Δ_CSI-RS means a subframe offset value, n_f means a system frame number, and n_s means a slot number.

In the case of a UE in which the transmission mode 9 has been configured with respect to a serving cell, one CSI-RS resource configuration may be configured for the UE. In the case of a UE in which the transmission mode 10 has been configured with respect to a serving cell, one or more CSI-RS resource configuration (s) may be configured for the UE.

In the current LTE standard, a CSI-RS configuration includes an antenna port number (antennaPortsCount), a subframe configuration (subframeConfig), and a resource configuration (resourceConfig). Accordingly, the a CSI-RS configuration provides notification that a CSI-RS is transmitted how many antenna port, provides notification of the period and offset of a subframe in which a CSI-RS will be transmitted, and provides notification that a CSI-RS is transmitted in which RE location (i.e., a frequency and OFDM symbol index) in a corresponding subframe.

Specifically, the following parameters for each CSI-RS (resource) configuration are configured through high layer signaling.

If the transmission mode 10 has been configured, a CSI-RS resource configuration identifier A CSI-RS port number (antennaPortsCount): a parameter (e.g., one CSI-RS port, two CSI-RS ports, four CSI-RS ports or eight CSI-RS ports) indicative of the number of antenna ports used for CSI-RS transmission A CSI-RS configuration (resourceConfig) (refer to Table 3 and Table 4): a parameter regarding a CSI-RS allocation resource location A CSI-RS subframe configuration (subframeConfig, that is, I_CSI-RS) (refer to Table 5): a parameter regarding the period and/or offset of a subframe in which a CSI-RS will be transmitted If the transmission mode 9 has been configured, transmission power P_C for CSI feedback: in relation to the assumption of a UE for reference PDSCH transmission power for feedback, when the UE derives CSI feedback and takes a value within a [−8, 15] dB range in a 1-dB step size, P_C is assumed to be the ratio of energy per resource element (EPRE) per PDSCH RE and a CSI-RS EPRE.

If the transmission mode 10 has been configured, transmission power P_C for CSI feedback with respect to each CSI process. If CSI subframe sets C_CSI,0 and C_CSI,1 are configured by a high layer with respect to a CSI process, P_C is configured for each CSI subframe set in the CSI process.

A pseudo-random sequence generator parameter n_ID

If the transmission mode 10 has been configured, a high layer parameter 'gel-CRS-Info-r11' including a QCL scrambling identifier for a quasico-located (QCL) type B UE assumption (qcl-ScramblingIdentity-r11), a CRS port count (crs-PortsCount-r11), and an MBSFN subframe configuration list (mbsfn-SubframeConfigList-r11) parameter.

When a CSI feedback value derived by a UE has a value within the [−8, 15] dB range, P_C is assumed to be the ration of PDSCH EPRE to CSI-RS EPRE. In this case, the PDSCH EPRE corresponds to a symbol in which the ratio of PDSCH EPRE to CRS EPRE is ρ_A.

A CSI-RS and a PMCH are not configured in the same subframe of a serving cell at the same time.

In the frame structure type 2, if four CRS antenna ports have been configured, a CSI-RS configuration index belonging to the [20-31] set (refer to Table 3) in the case of a normal CP or a CSI-RS configuration index belonging to the [16-27] set (refer to Table 4) in the case of an extended CP is not configured in a UE.

A UE may assume that the CSI-RS antenna port of a CSI-RS resource configuration has a QCL relation with delay spread, Doppler spread, Doppler shift, an average gain and average delay.

A UE in which the transmission mode 10 and the QCL type B have been configured may assume that antenna ports 0-3 corresponding to a CSI-RS resource configuration and antenna ports 15-22 corresponding to a CSI-RS resource configuration have QCL relation with Doppler spread and Doppler shift.

In the case of a UE in which the transmission modes 1-9 have been configured, one ZP CSI-RS resource configuration may be configured in the UE with respect to a serving cell. In the case of a UE in which the transmission mode 10 has been configured, one or more ZP CSI-RS resource configurations may be configured in the UE with respect to a serving cell.

The following parameters for a ZP CSI-RS resource configuration may be configured through high layer signaling.

The ZP CSI-RS configuration list (zeroTxPowerResourceConfigList) (refer to Table 3 and Table 4): a parameter regarding a zero-power CSI-RS configuration The ZP CSI-RS subframe configuration (eroTxPowerSubframeConfig, that is, I_CSI-RS) (refer to Table 5): a parameter regarding the period and/or offset of a subframe in which a zero-power CSI-RS is transmitted A ZP CSI-RS and a PMCH are not configured in the same subframe of a serving cell at the same time.

In the case of a UE in which the transmission mode 10 has been configured, one or more channel state information-interference measurement (CSI-IM) resource configurations may be configured in the UE with respect to a serving cell.

The following parameters for each CSI-IM resource configuration may be configured through high layer signaling.

The ZP CSI-RS configuration (refer to Table 3 and Table 4)

The ZP CSI RS subframe configuration I_CSI-RS (refer to Table 5)

A CSI-IM resource configuration is the same as any one of configured ZP CSI-RS resource configurations.

A CSI-IM resource and a PMCH are not configured within the same subframe of a serving cell at the same time.

Massive MIMO

A MIMO system having a plurality of antennas may be called a massive MIMO system and has been in the spotlight as means for improving spectrum efficiency, energy efficiency and processing complexity.

In recent 3GPP, in order to satisfy the requirements of spectrum efficiency for a future mobile communication system, a discussion about the massive MIMO system has started. The massive MIMO is also called full-dimension MIMO (FD-MIMO).

In a wireless communication system after LTE Release (Rel)-12, the introduction of an active antenna system (AAS) is considered.

Unlike the existing passive antenna system in which an amplifier and antenna capable of adjusting the phase and size of a signal have been separated, the AAS means a system in which each antenna is configured to include an active element, such as an amplifier.

The AAS does not require a separate cable, connector and other hardware for connecting an amplifier and an antenna because the active antenna is used, and thus has a high efficiency characteristic in terms of energy and operating costs. In particular, the AAS enables an advanced MIMO technology, such as the formation of an accurate beam pattern or 3D beam pattern in which a beam direction and a beam width are considered because the AAS supports each electronic beam control method.

Due to the introduction of an advanced antenna system, such as the AAS, a massive MIMO structure having a plurality of input/output antennas and a multi-dimension antenna structure is also considered. For example, unlike in the existing straight type antenna array, if a two-dimensional (2D) antenna array is formed, a 3D beam pattern can be formed by the active antenna of the AAS.

Figure 10:
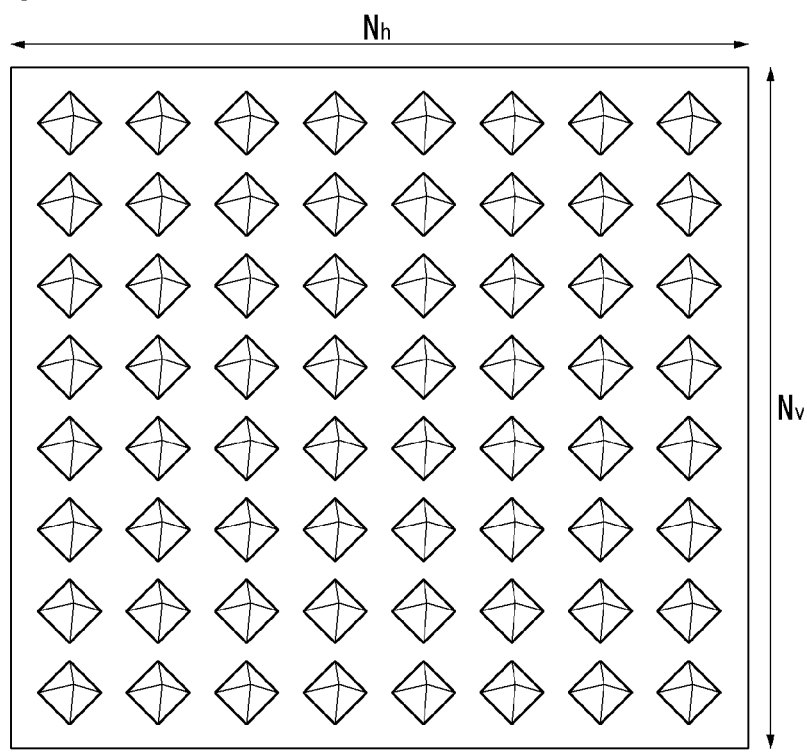
FIG. 10 illustrates a 2D-AAS having 64 antenna elements in a wireless communication system to which the present invention may be applied.

FIG. 10 illustrates a 2D-AAS having 64 antenna elements in a wireless communication system to which the present invention may be applied.

FIG. 10 illustrates a common 2D antenna array. A case where $N\_t = N\_v \cdot N\_h$ antennas has a square form as in FIG. 10 may be considered. In this case, $N\_h$ indicates the number of antenna columns in a horizontal direction, and $N\_v$ indicates the number of antenna rows in a vertical direction.

If the antenna array of such a 2D structure is used, radio waves can be controlled both in the vertical direction (elevation) and the horizontal direction (azimuth) so that a transmission beam can be controlled in the 3D space. A wavelength control mechanism of such a type may be called 3D beamforming.

Figure 11:
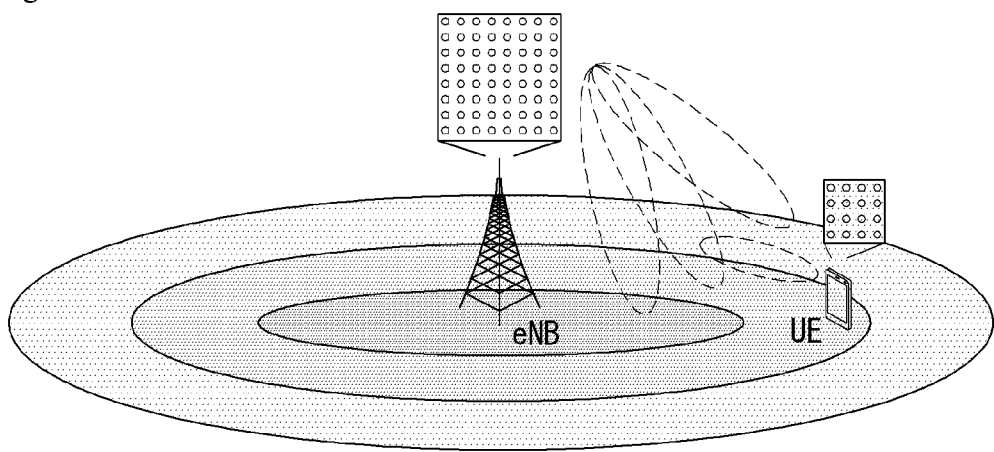
FIG. 11 illustrates a system in which an eNB or UE has a plurality of transmission/reception antennas capable of forming a 3-Dimension (3D) beam based on the AAS in a wireless communication system to which the present invention may be applied.

FIG. 11 illustrates a system in which an eNB or UE has a plurality of transmission/reception antennas capable of forming a 3D beam based on the AAS in a wireless communication system to which the present invention may be applied.

FIG. 11 is a diagram of the aforementioned example and illustrates a 3D MIMO system using a 2D antenna array (i.e., 2D-AAS).

From the point of view of a transmission antenna, if a 3D beam pattern is used, a semi-static or dynamic beam can be formed in the vertical direction of the beam in addition to the horizontal direction. For example, an application, such as the formation of a sector in the vertical direction, may be considered.

Furthermore, from the point of view of a reception antenna, when a reception beam is formed using a massive reception antenna, a signal power rise effect according to an antenna array gain may be expected. Accordingly, in the case of the uplink, an eNB can receive a signal from a UE through a plurality of antennas. In this case, there is an advantage in that the UE can set its transmission power very low by considering the gain of the massive reception antenna in order to reduce an interference influence.

Figure 12:
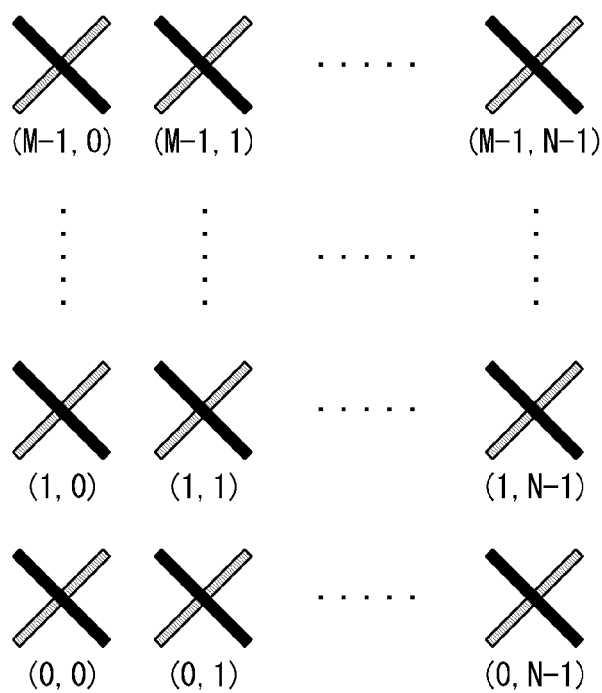
FIG. 12 illustrates a 2D antenna system having cross-polarizations in a wireless communication system to which the present invention may be applied.

FIG. 12 illustrates a 2D antenna system having cross-polarizations in a wireless communication system to which the present invention may be applied.

A 2D planar antenna array model in which polarization is considered may be diagrammed as shown in FIG. 12.

Unlike the existing MIMO system according to a passive antenna, a system based on an active antenna can dynamically control the gain of an antenna element by applying weight to an active element (e.g., an amplifier) to which each antenna element has been attached (or included). The antenna system may be modeled in an antenna element level because a radiation pattern depends on the number of antenna elements and an antenna arrangement, such as antenna spacing.

An antenna array model, such as the example of FIG. 12, may be represented by (M, N, P). This corresponds to a parameter that characterizes an antenna array structure.

M indicates the number of antenna elements having the same polarization in each column (i.e., the vertical direction) (i.e., the number of antenna elements having a +45° slant in each column or the number of antenna elements having a −45° slant in each column).

N indicates the number of columns in the horizontal direction (i.e., the number of antenna elements in the horizontal direction).

P indicates the number of dimensions of polarization. P=2 in the case of cross-polarization as in the case of FIG. 12, or P=1 in the case of co-polarization.

An antenna port may be mapped to a physical antenna element. The antenna port may be defined by a reference signal related to a corresponding antenna port. For example, in the LTE system, the antenna port 0 may be related to a cell-specific reference signal (CRS), and the antenna port 6 may be related to a positioning reference signal (PRS).

For example, an antenna port and a physical antenna element may be mapped in a one-to-one manner. This may correspond to a case where a single cross-polarization antenna element is used for downlink MIMO or downlink transmit diversity. For example, the antenna port 0 is mapped to one physical antenna element, whereas the antenna port 1 may be mapped to the other physical antenna element. In this case, from the point of view of a UE, two types of downlink transmission are present. One is related to a reference signal for the antenna port 0, and the other is related to a reference signal for the antenna port 1.

For another example, a single antenna port may be mapped to multiple physical antenna elements. This may correspond to a case where a single antenna port is used for beamforming. In beamforming, multiple physical antenna elements are used, so downlink transmission may be directed toward a specific UE. In general, this may be achieved using an antenna array configured using multiple columns of multiple cross-polarization antenna elements. In this case, from the point of view of a UE, one type of downlink transmission generated from a single antenna port is present. One is related to a CRS for the antenna port 0, and the other is related to a CRS for the antenna port 1.

That is, an antenna port indicates downlink transmission from the point of view of a UE not actual downlink transmission from a physical antenna element by an eNB.

For another example, a plurality of antenna ports is used for downlink transmission, but each antenna port may be mapped to multiple physical antenna elements. This may correspond to a case where an antenna array is used for downlink MIMO or downlink diversity. For example, each of the antenna ports 0 and 1 may be mapped to multiple physical antenna elements. In this case, from the point of view of a UE, two types of downlink transmission. One is related to a reference signal for the antenna port 0, and the other is related to a reference signal for the antenna port 1.

In FD-MIMO, the MIMO precoding of a data stream may experience antenna port virtualization, transceiver unit (or a transmission and reception unit) (TXRU) virtualization, and an antenna element pattern.

In the antenna port virtualization, a stream on an antenna port is precoded on a TXRU. In the TXRU virtualization, a TXRU signal is precoded on an antenna element. In the antenna element pattern, a signal radiated by an antenna element may have a directional gain pattern.

In the existing transceiver modeling, a static one-to-one mapping between an antenna port and a TXRU is assumed, and a TXRU virtualization effect is joined into a static (TXRU) antenna pattern including the effects of the TXRU virtualization and the antenna element pattern.

The antenna port virtualization may be performed by a frequency-selective method. In LTE, an antenna port, together with a reference signal (or pilot), is defined. For example, for precoded data transmission on an antenna port, a DMRS is transmitted in the same bandwidth as a data signal, and both the DMRS and data are precoded by the same precoder (or the same TXRU virtualization precoding). For CSI measurement, a CSI-RS is transmitted through multiple antenna ports. In CSI-RS transmission, a precoder that characterizes mapping between a CSI-RS port and a TXRU may be designed in a unique matrix so that a UE can estimate a TXRU virtualization precoding matrix for a data precoding vector.

A TXRU virtualization method is discussed in 1D TXRU virtualization and 2D TXRU virtualization, which are described below with reference to the following drawing.

Figure 13:
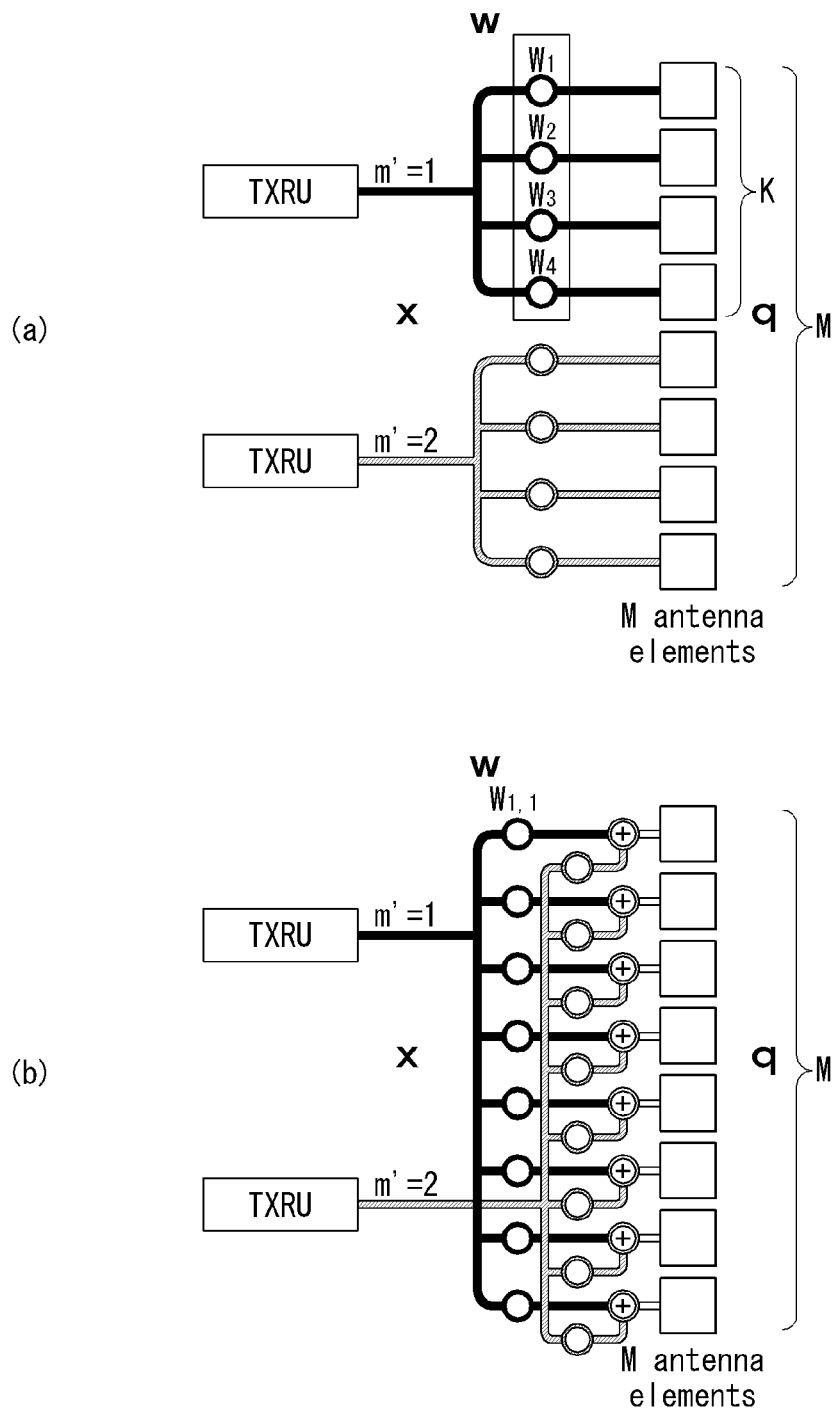
FIG. 13 illustrates a transceiver unit model in a wireless communication system to which the present invention may be applied.

FIG. 13 illustrates a transceiver unit model in a wireless communication system to which the present invention may be applied.

In the 1D TXRU virtualization, M_TXRU TXRUs are related to M antenna elements configured in a single column antenna array having the same polarization.

In the 2D TXRU virtualization, a TXRU model configuration corresponding to the antenna array model configuration (M, N, P) of FIG. 12 may be represented by (M_TXRU, N, P). In this case, M_TXRU means the number of TXRUs present in the 2D same column and same polarization, and always satisfies M_TXRU≤M. That is, the total number of TXRUs is the same as M_TXRU×N×P.

A TXRU virtualization model may be divided into a TXRU virtualization model option-1: sub-array partition model as in FIG. 13(*a*) and a TXRU virtualization model option-2: full connection model as in FIG. 13(*b*) depending on a correlation between an antenna element and a TXRU.

Referring to FIG. 13(*a*), in the case of the sub-array partition model, an antenna element is partitioned into multiple antenna element groups, and each TXRU is connected to one of the groups.

Referring to FIG. 13(*b*), in the case of the full-connection model, the signals of multiple TXRUs are combined and transferred to a single antenna element (or the arrangement of antenna elements).

In FIG. 13, q is the transmission signal vectors of antenna elements having M co-polarizations within one column. W is a wideband TXRU virtualization vector, and W is a wideband TXRU virtualization matrix. X is the signal vectors of M_TXRU TXRUs.

In this case, mapping between an antenna port and TXRUs may be one-to-one or one-to-many.

In FIG. 13, mapping between a TXRU and an antenna element (TXRU-to-element mapping) shows one example, but the present invention is not limited thereto. From the point of view of hardware, the present invention may be identically applied to mapping between an TXRU and an antenna element which may be implemented in various forms.

Definition of Precoding Matrix Indicator (PMI)

For transmission modes 4, 5, and 6, precoding feedback is used for channel-dependent codebook-based precoding and depends on the UE(s) reporting the PMI. For transmission mode 8, the UE reports the PMI. For transmission modes 9 and 10, the UE reports the PMI if the PMI/RI reporting is configured and the CSI-RS port is greater than one. The UE reports the PMI based on the feedback mode. For other transmission modes, PMI reporting is not supported.

For two antenna ports, each PMI value corresponds to Table 6 and the codebook index below.

When two antenna ports are $\{0,1\}$ or $\{15,16\}$ and a related RI value is 1, the PMI value corresponds to codebook index n when $\upsilon=1$ in Table 6 below ($n \in \{0, 1, 2, 3\}$).

When two antenna ports are $\{0,1\}$ or $\{15,16\}$ and the related RI value is 2, the PMI value corresponds to codebook index n+1 when $\upsilon=2$ in Table 6 below ($n \in \{0, 1\}$).

Table 6 illustrates codebooks for transmission on antenna port $\{0,1\}$ and for CSI reporting based on antenna port $\{0, 1\}$ or $\{15, 16\}$.

TABLE 6

| Codebook index | Number of layers (v) — 1 | Number of layers (v) — 2 |
|---|---|---|
| 0 | $\frac{1}{\sqrt{2}}\begin{bmatrix}1\\1\end{bmatrix}$ | $\frac{1}{\sqrt{2}}\begin{bmatrix}1 & 0\\0 & 1\end{bmatrix}$ |
| 1 | $\frac{1}{\sqrt{2}}\begin{bmatrix}1\\-1\end{bmatrix}$ | $\frac{1}{2}\begin{bmatrix}1 & 1\\1 & -1\end{bmatrix}$ |
| 2 | $\frac{1}{\sqrt{2}}\begin{bmatrix}1\\j\end{bmatrix}$ | $\frac{1}{2}\begin{bmatrix}1 & 1\\j & -j\end{bmatrix}$ |
| 3 | $\frac{1}{\sqrt{2}}\begin{bmatrix}1\\-j\end{bmatrix}$ | — |

If four antenna ports are $\{0, 1, 2, 3\}$ or $\{15, 16, 17, 18\}$, each PMI value corresponds to the codebook index given in Table 7 below as follows or corresponds to a pair of codebook indexes given in Tables 8 to 11 below.

The PMI value may correspond to codebook index n given in Table 7 below with respect to the same $\upsilon$ as the related RI value ($n \in \{0, 1, \ldots, 15\}$).

Alternatively, each PMI value may correspond to a pair of codebook indexes given in Tables 8 to 11. Here, in Table 8 and Table 11, $\varphi_n$, $\varphi'_n$, and $v'_m$ are shown in Equation 15 below.

$\varphi_n = e^{j\pi n/2}$ $\varphi'_n = e^{j2\pi n/32}$ $v'_m = [1\ e^{j2\pi n/32}]^T$ [Equation 15]

The first PMI value ($i_1 \in \{0, 1, \ldots, f(\upsilon)-1\}$) and the second PMI value ($i_2 \in \{0, 1, \ldots, g(\upsilon)-1\}$) correspond to the codebook indexes $i_1$ and $i_2$ given in Table j, respectively for the same as the related RI value. Here, for each of $\upsilon=\{1,2,3,4\}$, $f(\upsilon)=\{16,16,1,1\}$, and $g(\upsilon)=\{16,16,16,16\}$, j corresponds to 8, 9, 10, and 11.

In Tables 10 and 11, $W_n^{\{s\}}$ represents a matrix defined by columns given by set $\{s\}$ from $W_n = I - 2u_n u_n^H / u_n^H u_n$. Here, I represents 4×4 unit matrix and vector $u_n$ is determined in Table 7. In addition, $n=i_2$.

In some cases, codebook subsampling is supported.

Table 7 illustrates codebooks for transmission on antenna port $\{0, 1, 2, 3\}$ and for CSI reporting based on antenna port $\{0, 1, 2, 3\}$ or $\{15, 16, 17, 18\}$.

TABLE 7

| Codebook index | $u_n$ | Number of layers (v) — 1 | 2 | 3 | 4 |
|---|---|---|---|---|---|
| 0 | $u_0 = [1\ -1\ -1\ -1]^T$ | $W_0^{\{1\}}$ | $W_0^{\{14\}}/\sqrt{2}$ | $W_0^{\{124\}}/\sqrt{3}$ | $W_0^{\{1234\}}/2$ |
| 1 | $u_1 = [1\ -j\ 1\ j]^T$ | $W_1^{\{1\}}$ | $W_1^{\{12\}}/\sqrt{2}$ | $W_1^{\{123\}}/\sqrt{3}$ | $W_1^{\{1234\}}/2$ |
| 2 | $u_2 = [1\ 1\ -1\ 1]^T$ | $W_2^{\{1\}}$ | $W_2^{\{12\}}/\sqrt{2}$ | $W_2^{\{123\}}/\sqrt{3}$ | $W_2^{\{3214\}}/2$ |
| 3 | $u_3 = [1\ j\ 1\ -j]^T$ | $W_3^{\{1\}}$ | $W_3^{\{12\}}/\sqrt{2}$ | $W_3^{\{123\}}/\sqrt{3}$ | $W_3^{\{3214\}}/2$ |
| 4 | $u_4 = [1\ (-1-j)/\sqrt{2}\ -j\ (1-j)/\sqrt{2}]^T$ | $W_4^{\{1\}}$ | $W_4^{\{14\}}/\sqrt{2}$ | $W_4^{\{124\}}/\sqrt{3}$ | $W_4^{\{1234\}}/2$ |
| 5 | $u_5 = [1\ (1-j)/\sqrt{2}\ j\ (-1-j)/\sqrt{2}]^T$ | $W_5^{\{1\}}$ | $W_5^{\{14\}}/\sqrt{2}$ | $W_5^{\{124\}}/\sqrt{3}$ | $W_5^{\{1234\}}/2$ |
| 6 | $u_6 = [1\ (1+j)/\sqrt{2}\ -j\ (-1+j)/\sqrt{2}]^T$ | $W_6^{\{1\}}$ | $W_6^{\{13\}}/\sqrt{2}$ | $W_6^{\{134\}}/\sqrt{3}$ | $W_6^{\{1324\}}/2$ |
| 7 | $u_7 = [1\ (-1+j)/\sqrt{2}\ j\ (1+j)/\sqrt{2}]^T$ | $W_7^{\{1\}}$ | $W_7^{\{13\}}/\sqrt{2}$ | $W_7^{\{134\}}/\sqrt{3}$ | $W_7^{\{1324\}}/2$ |
| 8 | $u_8 = [1\ -1\ 1\ 1]^T$ | $W_8^{\{1\}}$ | $W_8^{\{12\}}/\sqrt{2}$ | $W_8^{\{124\}}/\sqrt{3}$ | $W_8^{\{1234\}}/2$ |
| 9 | $u_9 = [1\ -j\ -1\ -j]^T$ | $W_9^{\{1\}}$ | $W_9^{\{14\}}/\sqrt{2}$ | $W_9^{\{134\}}/\sqrt{3}$ | $W_9^{\{1234\}}/2$ |
| 10 | $u_{10} = [1\ 1\ 1\ -1]^T$ | $W_{10}^{\{1\}}$ | $W_{10}^{\{13\}}/\sqrt{2}$ | $W_{10}^{\{123\}}/\sqrt{3}$ | $W_{10}^{\{1324\}}/2$ |
| 11 | $u_{11} = [1\ j\ -1\ j]^T$ | $W_{11}^{\{1\}}$ | $W_{11}^{\{13\}}/\sqrt{2}$ | $W_{11}^{\{134\}}/\sqrt{3}$ | $W_{11}^{\{1324\}}/2$ |
| 12 | $u_{12} = [1\ -1\ -1\ 1]^T$ | $W_{12}^{\{1\}}$ | $W_{12}^{\{12\}}/\sqrt{2}$ | $W_{12}^{\{123\}}/\sqrt{3}$ | $W_{12}^{\{1234\}}/2$ |
| 13 | $u_{13} = [1\ -1\ 1\ -1]^T$ | $W_{13}^{\{1\}}$ | $W_{13}^{\{13\}}/\sqrt{2}$ | $W_{13}^{\{123\}}/\sqrt{3}$ | $W_{13}^{\{1324\}}/2$ |
| 14 | $u_{14} = [1\ 1\ -1\ -1]^T$ | $W_{14}^{\{1\}}$ | $W_{14}^{\{13\}}/\sqrt{2}$ | $W_{14}^{\{123\}}/\sqrt{3}$ | $W_{14}^{\{3214\}}/2$ |
| 15 | $u_{15} = [1\ 1\ 1\ 1]^T$ | $W_{15}^{\{1\}}$ | $W_{15}^{\{12\}}/\sqrt{2}$ | $W_{15}^{\{123\}}/\sqrt{3}$ | $W_{15}^{\{1234\}}/2$ |

Table 8 illustrates a codebook for 1 layer CSI reporting using antenna ports 0 to 3 or 15 to 18.

TABLE 8

| | $i_2$ | | | | | | | |
|---|---|---|---|---|---|---|---|---|
| $i_1$ | 0 | 1 | 2 | 3 | 4 | 5 | 6 | 7 |
| 0-15 | $W_{i_1,0}^{(1)}$ | $W_{i_1,8}^{(1)}$ | $W_{i_1,16}^{(1)}$ | $W_{i_1,24}^{(1)}$ | $W_{i_1+8,2}^{(1)}$ | $W_{i_1+8,10}^{(1)}$ | $W_{i_1+8,18}^{(1)}$ | $W_{i_1+8,26}^{(1)}$ |

| | $i_2$ | | | | | | | |
|---|---|---|---|---|---|---|---|---|
| $i_1$ | 8 | 9 | 10 | 11 | 12 | 13 | 14 | 15 |
| 0 - 15 | $W_{i_1+16,4}^{(1)}$ | $W_{i_1+16,12}^{(1)}$ | $W_{i_1+16,20}^{(1)}$ | $W_{i_1+16,28}^{(1)}$ | $W_{i_1+24,6}^{(1)}$ | $W_{i_1+24,14}^{(1)}$ | $W_{i_1+24,22}^{(1)}$ | $W_{i_1+24,30}^{(1)}$ |

$$W_{m,n}^{(1)} = \frac{1}{2}\begin{bmatrix} v'_m \\ \varphi'_n v'_m \end{bmatrix}$$

Table 9 illustrates a codebook for 2 layer CSI reporting using antenna ports 0 to 3 or 15 to 18.

TABLE 9

| | $i_2$ | | | |
|---|---|---|---|---|
| $i_1$ | 0 | 1 | 2 | 3 |
| 0-15 | $W_{i_1,i_1,0}^{(2)}$ | $W_{i_1,i_1,1}^{(2)}$ | $W_{i_1+8,i_1+8,0}^{(2)}$ | $W_{i_1+8,i_1+8,1}^{(2)}$ |

| | $i_2$ | | | |
|---|---|---|---|---|
| $i_1$ | 4 | 5 | 6 | 7 |
| 0 - 15 | $W_{i_1+16,i_1+16,0}^{(2)}$ | $W_{i_1+16,i_1+16,1}^{(2)}$ | $W_{i_1+24,i_1+24,0}^{(2)}$ | $W_{i_1+24,i_1+24,1}^{(2)}$ |

| | $i_2$ | | | |
|---|---|---|---|---|
| $i_1$ | 8 | 9 | 10 | 11 |
| 0 - 15 | $W_{i_1,i_1+8,0}^{(2)}$ | $W_{i_1,i_1+8,1}^{(2)}$ | $W_{i_1+8,i_1+16,0}^{(2)}$ | $W_{i_1+8,i_1+16,1}^{(2)}$ |

| | $i_2$ | | | |
|---|---|---|---|---|
| $i_1$ | 12 | 13 | 14 | 15 |
| 0 - 15 | $W_{i_1,i_1+24,0}^{(2)}$ | $W_{i_1,i_1+24,1}^{(2)}$ | $W_{i_1+8,i_1+24,0}^{(2)}$ | $W_{i_1+8,i_1+24,1}^{(2)}$ |

$$W_{m,m',n}^{(2)} = \frac{1}{\sqrt{8}}\begin{bmatrix} v'_m & v'_{m'} \\ \varphi'_n v'_m & -\varphi'_n v'_{m'} \end{bmatrix}$$

Table 10 illustrates a codebook for 3 layer CSI reporting using antenna ports 15 to 18.

TABLE 10

| | $i_2$ | | | | | | | |
|---|---|---|---|---|---|---|---|---|
| $i_1$ | 0 | 1 | 2 | 3 | 4 | 5 | 6 | 7 |
| 0 | $W_0^{\{124\}}/\sqrt{3}$ | $W_1^{\{123\}}/\sqrt{3}$ | $W_2^{\{123\}}/\sqrt{3}$ | $W_3^{\{123\}}/\sqrt{3}$ | $W_4^{\{124\}}/\sqrt{3}$ | $W_5^{\{124\}}/\sqrt{3}$ | $W_6^{\{134\}}/\sqrt{3}$ | $W_7^{\{134\}}/\sqrt{3}$ |

| | $i_2$ | | | | | | | |
|---|---|---|---|---|---|---|---|---|
| $i_1$ | 8 | 9 | 10 | 11 | 12 | 13 | 14 | 15 |
| 0 | $W_8^{\{124\}}/\sqrt{3}$ | $W_9^{\{134\}}/\sqrt{3}$ | $W_{10}^{\{123\}}/\sqrt{3}$ | $W_{11}^{\{134\}}/\sqrt{3}$ | $W_{12}^{\{123\}}/\sqrt{3}$ | $W_{13}^{\{123\}}/\sqrt{3}$ | $W_{14}^{\{123\}}/\sqrt{3}$ | $W_{15}^{\{123\}}/\sqrt{3}$ |

Table 11 illustrates a codebook for 4 layer CSI reporting using antenna ports 15 to 18.

TABLE 11

| $i_1$ | $i_2$ | | | | | | | |
|---|---|---|---|---|---|---|---|---|
| | 0 | 1 | 2 | 3 | 4 | 5 | 6 | 7 |
| 0 | $W_0^{\{1234\}}/2$ | $W_1^{\{1234\}}/2$ | $W_2^{\{3214\}}/2$ | $W_3^{\{3214\}}/2$ | $W_4^{\{1234\}}/2$ | $W_5^{\{1234\}}/2$ | $W_6^{\{1324\}}/2$ | $W_7^{\{1324\}}/2$ |
| | $i_2$ | | | | | | | |
| | 8 | 9 | 10 | 11 | 12 | 13 | 14 | 15 |
| 0 | $W_8^{\{1234\}}/2$ | $W_9^{\{1234\}}/2$ | $W_{10}^{\{1324\}}/2$ | $W_{11}^{\{1324\}}/2$ | $W_{12}^{\{1234\}}/2$ | $W_{13}^{\{1324\}}/2$ | $W_{14}^{\{3214\}}/2$ | $W_{15}^{\{1234\}}/2$ |

In the case of 8 antenna ports, each PMI value corresponds to a pair of codebook indexes given in Tables 12 to 19 below. Here, $\varphi_n$ and $v_m$ are shown in Equation 16 below.

$$\varphi_n = e^{j\pi n/2}$$

$$v_m [1\; e^{j2\pi m/32}\; e^{j4\pi m/32}\; e^{j6\pi m/32}]^T \qquad [\text{Equation 16}]$$

In the case of 8 antenna ports {15,16,17,18,19,20,21,22}, the first PMI value ($i_1 \in \{0, 1, \ldots, f(\upsilon)-1\}$) and the second PMI value ($i_2 \in \{0, 1, \ldots, g(\upsilon)-1\}$) correspond to codebook indexes $i_1$ and $i_2$ given in Table j with respect to the same $\upsilon$ as the related RI value, respectively. Here, $j=\upsilon$, $f(\upsilon)=\{16, 16, 4, 4, 4, 4, 4, 1\}$, and $g(\upsilon)=\{16, 16, 16, 8, 1, 1, 1, 1\}$.

In some cases, the codebook subsampling is supported.

Table 12 illustrates a codebook for 1 layer CSI reporting using antenna ports 15 to 22.

TABLE 12

| $i_1$ | $i_2$ | | | | | | | |
|---|---|---|---|---|---|---|---|---|
| | 0 | 1 | 2 | 3 | 4 | 5 | 6 | 7 |
| 0-15 | $W_{2i_1,0}^{(1)}$ | $W_{2i_1,1}^{(1)}$ | $W_{2i_1,2}^{(1)}$ | $W_{2i_1,3}^{(1)}$ | $W_{2i_1+1,0}^{(1)}$ | $W_{2i_1+1,1}^{(1)}$ | $W_{2i_1+1,2}^{(1)}$ | $W_{2i_1+1,3}^{(1)}$ |
| | $i_2$ | | | | | | | |
| | 8 | 9 | 10 | 11 | 12 | 13 | 14 | 15 |
| 0 - 15 | $W_{2i_1+2,0}^{(1)}$ | $W_{2i_1+2,1}^{(1)}$ | $W_{2i_1+2,2}^{(1)}$ | $W_{2i_1+2,3}^{(1)}$ | $W_{2i_1+3,0}^{(1)}$ | $W_{2i_1+3,1}^{(1)}$ | $W_{2i_1+3,2}^{(1)}$ | $W_{2i_1+3,3}^{(1)}$ |

$$W_{m,n}^{(1)} = \frac{1}{\sqrt{8}} \begin{bmatrix} v_m \\ \varphi_n v_m \end{bmatrix}$$

Table 13 illustrates a codebook for 2 layer CSI reporting using antenna ports 15 to 22.

TABLE 13

| $i_1$ | $i_2$ | | | |
|---|---|---|---|---|
| | 0 | 1 | 2 | 3 |
| 0-15 | $W_{2i_1,2i_1,0}^{(2)}$ | $W_{2i_1,2i_1,1}^{(2)}$ | $W_{2i_1+1,2i_1+1,0}^{(2)}$ | $W_{2i_1+1,2i_1+1,1}^{(2)}$ |
| | $i_2$ | | | |
| | 4 | 5 | 6 | 7 |
| 0 - 15 | $W_{2i_1+2,2i_1+2,0}^{(2)}$ | $W_{2i_1+2,2i_1+2,1}^{(2)}$ | $W_{2i_1+3,2i_1+3,0}^{(2)}$ | $W_{2i_1+3,2i_1+3,1}^{(2)}$ |
| | $i_2$ | | | |
| | 8 | 9 | 10 | 11 |
| 0 - 15 | $W_{2i_1,2i_1+1,0}^{(2)}$ | $W_{2i_1,2i_1+1,1}^{(2)}$ | $W_{2i_1+1,2i_1+2,0}^{(2)}$ | $W_{2i_1+1,2i_1+2,1}^{(2)}$ |
| | $i_2$ | | | |
| | 12 | 13 | 14 | 15 |
| 0 - 15 | $W_{2i_1,2i_1+3,0}^{(2)}$ | $W_{2i_1,2i_1+3,1}^{(2)}$ | $W_{2i_1+1,2i_1+3,0}^{(2)}$ | $W_{2i_1+1,2i_1+3,1}^{(2)}$ |

$$W_{m,m',n}^{(2)} = \frac{1}{4} \begin{bmatrix} v_m & v_{m'} \\ \varphi_n v_m & -\varphi_n v_{m'} \end{bmatrix}$$

Table 14 illustrates a codebook for 3 layer CSI reporting using antenna ports 15 to 22.

TABLE 14

| | $i_2$ | | | |
|---|---|---|---|---|
| $i_1$ | 0 | 1 | 2 | 3 |
| 0-3 | $W_{8i_1,8i_1,8i_1+8}^{(3)}$ | $W_{8i_1+8,8i_1,8i_1+8}^{(3)}$ | $\tilde{W}_{8i_1,8i_1+8,8i_1+8}^{(3)}$ | $\tilde{W}_{8i_1+8,8i_1,8i_1}^{(3)}$ |

| | $i_2$ | | | |
|---|---|---|---|---|
| $i_1$ | 4 | 5 | 6 | 7 |
| 0-3 | $W_{8i_1+2,8i_1+2,8i_1+10}^{(3)}$ | $W_{8i_1+10,8i_1+2,8i_1+10}^{(3)}$ | $\tilde{W}_{8i_1+2,8i_1+10,8i_1+10}^{(3)}$ | $\tilde{W}_{8i_1+10,8i_1+2,8i_1+2}^{(3)}$ |

| | $i_2$ | | | |
|---|---|---|---|---|
| $i_1$ | 8 | 9 | 10 | 11 |
| 0-3 | $W_{8i_1+4,8i_1+4,8i_1+12}^{(3)}$ | $W_{8i_1+12,8i_1+4,8i_1+12}^{(3)}$ | $\tilde{W}_{8i_1+4,8i_1+12,8i_1+12}^{(3)}$ | $\tilde{W}_{8i_1+12,8i_1+4,8i_1+4}^{(3)}$ |

| | $i_2$ | | | |
|---|---|---|---|---|
| $i_1$ | 12 | 13 | 14 | 15 |
| 0-3 | $W_{8i_1+6,8i_1+6,8i_1+14}^{(3)}$ | $W_{8i_1+14,8i_1+6,8i_1+14}^{(3)}$ | $\tilde{W}_{8i_1+6,8i_1+14,8i_1+14}^{(3)}$ | $\tilde{W}_{8i_1+14,8i_1+6,8i_1+6}^{(3)}$ |

$$W_{m,m',m''}^{(3)} = \frac{1}{\sqrt{24}} \begin{bmatrix} v_m & v_{m'} & v_{m''} \\ v_m & -v_{m'} & -v_{m''} \end{bmatrix},$$

$$\tilde{W}_{m,m',m''}^{(3)} = \frac{1}{\sqrt{24}} \begin{bmatrix} v_m & v_{m'} & v_{m''} \\ v_m & v_{m'} & -v_{m''} \end{bmatrix}$$

Table 15 illustrates a codebook for 4 layer CSI reporting using antenna ports 15 to 22.

TABLE 15

| | $i_2$ | | | |
|---|---|---|---|---|
| $i_1$ | 0 | 1 | 2 | 3 |
| 0-3 | $W_{8i_1,8i_1+8,0}^{(4)}$ | $W_{8i_1,8i_1+8,1}^{(4)}$ | $W_{8i_1+2,8i_1+10,0}^{(4)}$ | $W_{8i_1+2,8i_1+10,1}^{(4)}$ |

| | $i_2$ | | | |
|---|---|---|---|---|
| $i_1$ | 4 | 5 | 6 | 7 |
| 0-3 | $W_{8i_1+4,8i_1+12,0}^{(4)}$ | $W_{8i_1+4,8i_1+12,1}^{(4)}$ | $W_{8i_1+6,8i_1+14,0}^{(4)}$ | $W_{8i_1+6,8i_1+14,1}^{(4)}$ |

$$W_{m,m',n}^{(4)} = \frac{1}{\sqrt{32}} \begin{bmatrix} v_m & v_{m'} & v_m & v_{m'} \\ \varphi_n v_m & \varphi_n v_{m'} & -\varphi_n v_m & -\varphi_n v_{m'} \end{bmatrix}$$

Table 16 illustrates a codebook for 5 layer CSI reporting using antenna ports 15 to 22.

TABLE 16

| | $i_2$ |
|---|---|
| $i_1$ | 0 |
| 0-3 | $W_{i_1}^{(5)} = \frac{1}{\sqrt{40}} \begin{bmatrix} v_{2i_1} & v_{2i_1} & v_{2i_1+8} & v_{2i_1+8} & v_{2i_1+16} \\ v_{2i_1} & -v_{2i_1} & v_{2i_1+8} & -v_{2i_1+8} & v_{2i_1+16} \end{bmatrix}$ |

Table 17 illustrates a codebook for 6 layer CSI reporting using antenna ports 15 to 22.

TABLE 17

| | $i_2$ |
|---|---|
| $i_1$ | 0 |
| 0-3 | $W_{i_1}^{(6)} = \frac{1}{\sqrt{48}} \begin{bmatrix} v_{2i_1} & v_{2i_1} & v_{2i_1+8} & v_{2i_1+8} & v_{2i_1+16} & v_{2i_1+16} \\ v_{2i_1} & -v_{2i_1} & v_{2i_1+8} & -v_{2i_1+8} & v_{2i_1+16} & -v_{2i_1+16} \end{bmatrix}$ |

Table 18 illustrates a codebook for 7 layer CSI reporting using antenna ports 15 to 22.

TABLE 18

| | $i_2$ |
|---|---|
| $i_1$ | 0 |
| 0-3 | $W_{i_1}^{(7)} = \frac{1}{\sqrt{56}} \begin{bmatrix} v_{2i_1} & v_{2i_1} & v_{2i_1+8} & v_{2i_1+8} & v_{2i_1+16} & v_{2i_1+16} & v_{2i_1+24} \\ v_{2i_1} & -v_{2i_1} & v_{2i_1+8} & -v_{2i_1+8} & v_{2i_1+16} & -v_{2i_1+16} & v_{2i_1+24} \end{bmatrix}$ |

Table 19 illustrates a codebook for 8 layer CSI reporting using antenna ports 15 to 22.

TABLE 19

| $i_1$ | $i_2$ |
|---|---|
|  | 0 |
| 0 | $W_{i_1}^{(8)} = \frac{1}{8} \begin{bmatrix} v_{2i_1} & v_{2i_1} & v_{2i_1+8} & v_{2i_1+8} & v_{2i_1+16} & v_{2i_1+16} & v_{2i_1+24} & v_{2i_1+24} \\ v_{2i_1} & -v_{2i_1} & v_{2i_1+8} & -v_{2i_1+8} & v_{2i_1+16} & -v_{2i_1+16} & v_{2i_1+24} & -v_{2i_1+24} \end{bmatrix}$ |

Channel State Information Reporting Method

The present invention proposes a codebook design for a wireless communication system having (using) an x-port (x>=8) or more antenna ports. Here, the antenna port layout may be one-dimensional (1D), two-dimensional (2D), or multi-dimensional equal thereto or more there than.

Hereinafter, in the description of the present invention, an MIMO system in which a two-dimensional active antenna system (AAS) is installed will be mainly described, but the present invention is not limited thereto.

FIG. 14 is a diagram illustrating an antenna layout usable in a wireless communication system to which the present invention may be applied.

FIG. 14(a) illustrates 8, 12, 16 TXRU 2D AAS and FIG. 14(b) illustrates 12, 16 TXRU 1D AAS.

In FIG. 14, M represents the number (i.e., the number of antenna elements having a slant of +45° in each column or the number of antenna elements having a slant of −45° in each column) of antenna elements having the same polarization in each column (i.e., in the vertical direction).

In FIG. 14, N represents the number (i.e., the number of antenna elements having a slant of +45° in each row or the number of antenna elements having a slant of −45° in each row) of antenna elements having the same polarization in each row (i.e., in the horizontal direction).

P represents the number of dimensions of polarization. Like the case of FIG. 14, P=2 for cross polarization, but P=1 for co-polarization.

Q represents the total number of antenna elements.

In particular, the present invention proposes a method of using a legacy 8Tx codebook in order to design the codebook for x-port (x>=8) or more antenna ports.

First, the legacy 8-Tx codebook is illustrated in Tables 12 to 19 above. The Legacy 8Tx codebook may be configured by dividing the PMI of the 8Tx codebook into two precoders, i.e., W1 which is a long term and/or wideband precoder and W2 which is a short term and/or subband precoder in order to increase accuracy of a feedback channel.

Figure 17:
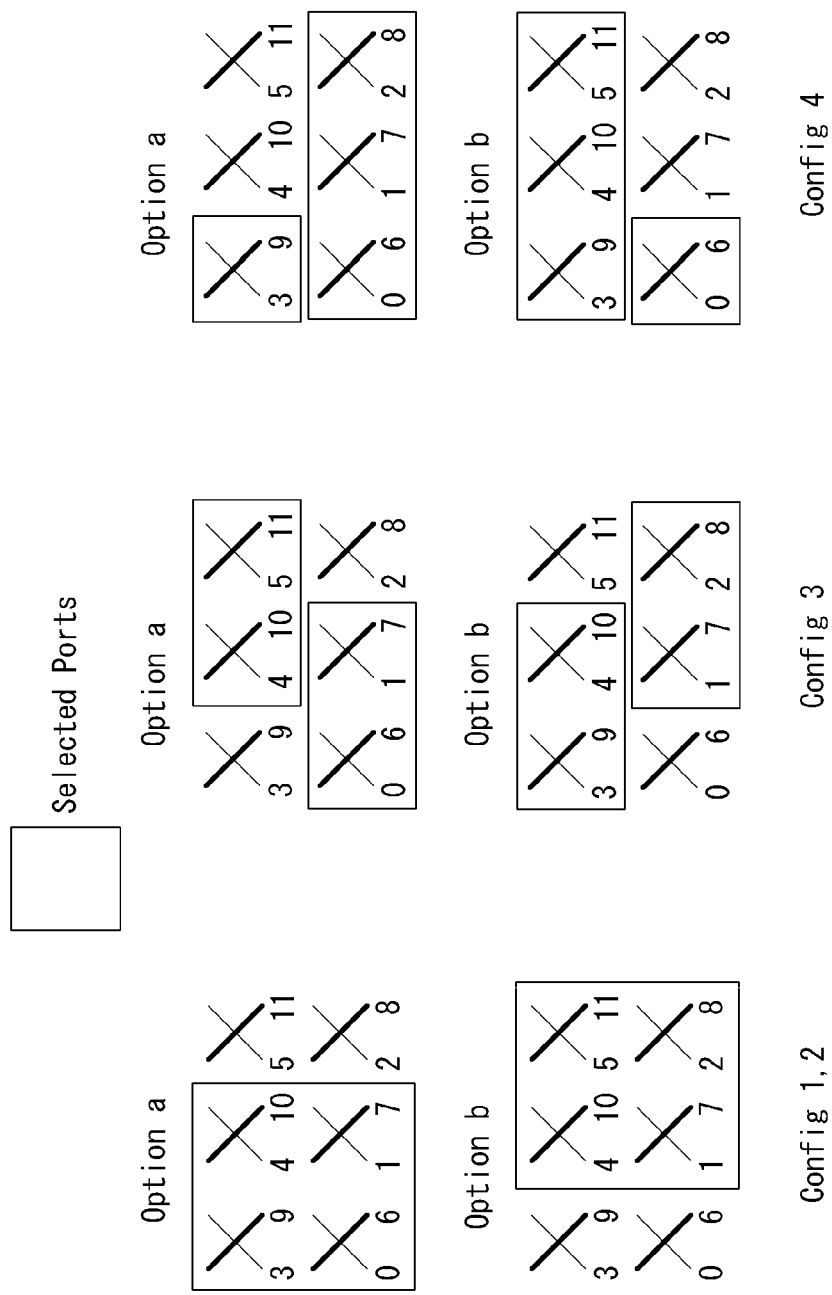
FIG. 17 illustrates a method for selecting an antenna port for each codebook configuration according to an embodiment of the present invention.

The Legacy 8Tx codebook is expressed by the product of W1 and W2 as shown in Equation 17 configuring one final PMI from both channel information.

$$W = \text{norm}(W_1 W_2) \qquad \text{[FIG. 17]}$$

In the above equation, W is a precoder generated from W1 and W2 and the UE feeds back the information to the base station. norm(A) means a matrix in which norm for each column of matrix A is normalized to 1. The concrete structure of W1 and W2 in the 8Tx codebook defined in the 3GPP LTE/LTE-A system is shown in Equation 18 below.

$$W_1(i_1) = \begin{bmatrix} X_i & 0 \\ 0 & X_i \end{bmatrix}, \qquad \text{[Equation 18]}$$

where $X_i$ is $Nt/2$ by $M$ matrix.

$$W_2(i_2) = \begin{bmatrix} \overbrace{\begin{matrix} e_M^k & e_M^l & \cdots & e_M^m \\ \alpha_{i_2} e_M^k & \beta_{i_2} e_M^l & \cdots & \gamma_{i_2} e_M^m \end{matrix}}^{r \text{ columns}} \end{bmatrix}$$

(if rank = $r$), where $1 \le k, l, m \le M$ and $k, l, m$ are integer.

Here, i1 and i2 represent W1 and W2, respectively and $e_M^k$ represents a selection vector having a length of M, in which a value of a k-th element is 1 and the remaining values are 0.

Such a codebook structure may be applied even to the system using the 2D AAS and when the codebook structure is expressed by an equation, the codebook structure is shown in Equation 19 below.

$$W = W_2 W_2 = (W_{1H} \otimes W_{1V})(W_{2H} | W_{2V}) \qquad \text{[Equation 19]}$$

Here, W1 represents a long-term nature of the channel and is fed back in units of wideband. W2 represents a short-term nature of the channel and is fed back in units of subband and is mainly used for selection and co-phasing (e.g., in the case of a cross polarization antenna). Further, subscripts H and V mean horizontal and vertical directions, respectively and $\otimes$ means a Kronecker product.

$W_{1V}$ is selected as a subset of D matrix constituted by columns in the DFT codebook D matrix shown in Equation 20.

$$D_{(mn)}^{N_v \times N_v Q_v} = \frac{1}{\sqrt{N_v}} e^{j\frac{2\pi(m-1)(n-1)}{N_v Q_v}}, \qquad \text{[Equation 20]}$$

for $m = 1, 2, \ldots, N_v, n = 1, 2, \ldots, N_v Q_v$

In the DFT codebook shown in Equation 20 above, $Q_v$ represents an oversampling factor and $N_v$ represents the number of vertical antenna ports. Here, the antenna port may become an antenna element according to antenna virtualization. Hereinafter, in the description of the present invention, the antenna port will be referred to as an antenna port for convenience of description.

Further, similarly to this, W_1H is selected as a subset of D matrix constituted by the columns in D matrix shown in Equation 21 below. The DFT codebook may be created as shown in Equation 21 below.

$$D_{(mn)}^{N_h \times N_h Q_h} = \frac{1}{\sqrt{N_h}} e^{j\frac{2\pi(m-1)(n-1)}{N_h Q_h}}, \qquad \text{[Equation 21]}$$

for $m = 1, 2, \ldots, N_h, n = 1, 2, \ldots, N_h Q_h$

In the DFT codebook shown in Equation 21 above, $Q_h$ represents the oversampling factor and $N_h$ represents the number of horizontal antenna ports.

The size of the codebook is determined by the number of antenna ports constituting the codebook and the oversampling factor when configuring the codebook.

Therefore, it is apparent that as the number of antenna ports considered in the present invention increases, the size of the codebook becomes larger, and accordingly feedback overhead increases.

Accordingly, the present invention proposes a method of using a codebook constituted by fewer ports than the set number of antenna ports for such a purpose.

In the method proposed by the present invention, proposed is a method for reporting channel state information derived based on a reference signal (for example, CSI-RS) transmitted on y multi-antenna ports by selecting y (y<x) multi-antenna ports from x multi-antenna ports.

In particular, in the description of the present invention, a method for reporting channel state information and/or a port numbering method by selecting eight antenna ports at given x ports in order to utilize legacy 8Tx is primarily described, but the present invention is not limited thereto. This will be described with reference to drawings given below.

FIG. 15 is a diagram illustrating an antenna layout usable in a wireless communication system to which the present invention may be applied.

In FIG. 15, for convenience of description of the present invention, among various antenna port layouts illustrated in FIG. 14, a fat antenna array in which the total number of columns is larger than the number of rows, that is, (2, 4, 2, 16), (2, 3, 2, 12) will be described as an example.

FIG. 15(*a*) illustrates port numbering in the (2, 4, 2, 16) antenna port array and FIG. 15(*b*) illustrates port numbering in (2, 3, 2, 12) antenna port array.

In FIG. 15, an antenna port number is represented by numbers such as 0 to 15 for convenience. However, the present invention is not limited thereto, and the antenna port number may be mapped to other numbers (for example, 15 to 31).

A method of selecting 8 ports from 16 ports illustrated in FIG. 15(*a*) is as follows.

Hereinafter, in the invention proposed in the present invention, the selection scheme of the antenna port may be applied to a specific previously fixed rank(s). Alternatively, the selection scheme of the antenna port according to the present invention may be applied to the rank(s) configured by the base station through higher layer signaling (e.g., RRC signaling, etc.).

In this case, the rank(s) to which the selection scheme of the antenna port according to the present invention is applied may be fixed in advance independently for each codebook configuration ('CodebookConfig') (that is, the codebook configuration indicates a subset of the codebook items) or configured through the higher layer signaling (e.g., RRC signaling, etc.) by the base station.

1. The base station may transmit the reference signal through antenna ports 0 to 15. In this case, the UE measures the channel between the antenna ports constituted by {0, 1, 2, 3, 8, 9, 10, 11} or {4, 5, 6, 7, 12, 13, 14, 15} and the UE and select the measured channel and the most preferred PMI (e.g., the PMI that maximizes the CQI). In other words, the UE may select the PMI indicating the most preferred precoding matrix in the 8-port codebook based on the channel measured by using the CSI-RS transmitted through the antenna ports constituted by {0, 1, 2, 3, 8, 9, 10, 11} or {4, 5, 6, 7, 12, 13, 14, 15}.

Such a scheme is the same as the antenna layout considered in the legacy 8-port (that is, the antenna layout to which the legacy 8-port codebook is applicable). As a result, when such a scheme is used, there is an advantage in that performance degradation may be minimized as compared with other options.

2. In the case of method 1 above, the total port transmission power is de-boosted to 8/x as compared with the full port transmission scheme (x port transmission when x>=8) and the corresponding CQI value may also be de-boosted.

In order to improve this point, new virtual 8 ports are created by combining y (y=2, 3, 4, . . . ) specific 8-port groups and the PMI that is the most optimal may be selected. A scheme that combines y specific 8-port groups may include the following example.

a) In one embodiment, a method may be considered, which sums up a channel $h_1$ between the ports constituted by {0, 1, 2, 3, 8, 9, 10, 11} and the UE and a channel $h_2$ between ports constituted by {4, 5, 6, 7, 12, 13, 14, 15} and the UE when x=16. In this case, the channel between the virtual 8-port and the UE may correspond to $h_1+h_2$.

In this case, since the UE may use both reference signals transmitted on the ports constituted by {0, 1, 2, 3, 8, 9, 10, 11} and reference signals transmitted on the ports constituted by {4, 5, 6, 7, 12, 13, 14, 15}, the UE may consequently use more power. Accordingly, $CQI_2$ corresponding thereto may have a value larger than $CQI_1$ calculated by method 1 above.

In other words, a total of x (e.g., 16) multi-antenna ports may be grouped into a plurality of antenna port groups in units of y (e.g., 2) multi-antenna ports. Then, the entire channel may be derived by summing the channels based on the reference signal transmitted on the antenna port in each antenna port group. The UE may select the PMI indicating the most preferred precoding matrix in the codebook of y multi-antenna ports based on the derived entire channel (e.g., $h_1+h_2$). In this case, the selected precoding matrix may be similarly applied to each antenna port group.

Alternatively, the UE may individually derive the channel for each antenna port group based on the reference signal transmitted on the antenna port in each antenna port group. In addition, the UE may individually select the PMI indicating the most preferred precoding matrix in the codebook of y multi-antenna ports for each antenna port group. In this case, an independent precoding matrix which is independently determined may be applied for each antenna port group.

b) When scheme a) above is expressed by a more general formula, scheme a) may correspond to $w_1h_1+w_2h_2$. Here, $w_1$ and $w_2$ are complex weight values.

In this case, values of $w_1$ and $w_2$ may be specific predetermined complex value defined beforehand between the base station and the UE.

For example, the values of $w_1$ and $w_2$ may be set to [1 exp(j2·2π/32)] by considering the antenna array and the legacy 8 Tx codebook. Such complex weight values (or corresponding precoders) may be pre-agreed between the UE and the base station or the base station may inform of complex weight values the UE by the higher layer signaling (e.g., RRC signaling) or a first layer (L1, physical layer) or a second layer 2 (L2, MAC layer) signaling.

c) Further, in order to enhance the performance of scheme b), the UE may feed back $w_1$ and $w_2$ to the base station.

For such feedback of the UE, a codebook having a weight value as shown in Table 20 below may be used. In this way, when using the codebook as shown in Table 20, the UE may inform of an index corresponding to a weight of the base station dynamically (for example, the first layer (L1, physical layer) signaling or the second layer (L2, MAC layer) signaling) or semi-statically (e.g., RRC signaling).

Further, in order to reduce a feedback amount of the weight value of the UE, the UE may feedback the index to the base station using only a part of the codebook of the weight vector illustrated in Table 20 below. For example, the weights may be fed back by using indexes of 0 and 1 when 1-bit feedback is configured, using indexes of 0 to 3 when 2-bit feedback is configured, and using indexes of 0 to 7 when 3-bit feedback is configured. That is, the entire or a subset of the codebook of the weight vector may be used depending on the number of feedback bits.

Table 20 shows the codebook of the weight vector.

TABLE 20

| Index | 0 | 1 | 2 | 3 |
|---|---|---|---|---|
| [w1 w2] | [1 1] | [1 j] | [1 −1] | [1 −j] |
| Index | 4 | 5 | 6 | 7 |
| [w1 w2] | $\left[1 \; \frac{1+j}{\sqrt{2}}\right]$ | $\left[1 \; \frac{-1+j}{\sqrt{2}}\right]$ | $\left[1 \; \frac{-1-j}{\sqrt{2}}\right]$ | $\left[1 \; \frac{1-j}{\sqrt{2}}\right]$ | d) In another example, to use the legacy 8-port codebook in y=3, i.e., x=24 port AAS, the weight vector in the example illustrated above may be set to [w1 w2 w3]=[1 1 1] or [w1 w2 w3]=[1 exp(j2π/32) exp(j4π/32)]. This may be pre-agreed between the UE and the base station or the base station may inform of the weight vector the UE through the higher layer signaling (for example, RRC signaling) or the first layer (L1, physical layer) or the second layer (L2, MAC layer).

e) The proposed method is not limited to legacy 8-Tx, but may be used when a codebook expressed by x-port and a common divisor thereof is used. As one example, when the 16-port codebook is used in the 32-port AAS, the 16-port codebook may be reused by using the methods described in a), b), and c) above.

3. Alternatively, a method of configuring the 8 ports by selecting two predetermined columns in the port layout illustrated in FIG. 15(a) may be used.

For example, a PMI (for example, PMI to maximize the CQI) may be selected, which is best for the channel between 8 ports constituted by a combination of the first and second columns, a combination of the first and third columns, a combination of the first and fourth columns, a combination of the second and third columns, a combination of the second and fourth columns, or a combination of the third and fourth columns and the UE.

In other words, the UE may select the PMI indicating the most preferred precoding matrix in the 8-port codebook based on the channel measured by using the CSI-RS transmitted through y multi-antenna ports constituted by two predetermined columns of antenna port in the port layout illustrated in FIG. 15(a).

4. Further, similarly as in scheme 2 above, the UE may measure the channel between the ports constituted by {0, 2, 4, 6, 8, 10, 12, 14} and the UE and the channel between the ports constituted by {1, 3, 5, 7, 9, 11, 13, 15} and the UE and the PMI indicating the precoding matrix may be selected, which is best in the 8-port codebook may be selected based on the sum (i.e., $w_1h_1+w_2h_2$) derived by using the weight codebook shown in Table 20 above.

As described above, a total of x (e.g., 16) multi-antenna ports may be grouped into a plurality of antenna port groups in units of y (e.g., 8) multi-antenna ports. Then, the entire channel may be derived by weight-summing the channels based on the reference signal transmitted on the antenna port in each antenna port group. The UE may select the PMI indicating the most preferred precoding matrix in the codebook of y multi-antenna ports based on the derived entire channel (e.g., $w_1h_1+w_2h_2$). In this case, the selected precoding matrix may be similarly applied to each antenna port group.

Alternatively, the UE may individually derive the channel for each antenna port group based on the reference signal transmitted on the antenna port in each antenna port group. In addition, the UE may individually select the PMI indicating the most preferred precoding matrix in the codebook of y multi-antenna ports for each antenna port group. In this case, an independent precoding matrix which is independently determined may be applied for each antenna port group.

5. The methods proposed in schemes 1 to 4 above may be integrated for each rank or applied independently for each rank.

As one example, in the case of Rel. 13 codebook, in ranks 1 to 4 requiring high beam granularity, a predefined 2D codebook may be used and in ranks 5 to 8, the method proposed in schemes 1 to 4 above may be used.

When the method proposed in schemes 1 to 4 above is used, the complexity can be significantly reduced as compared with the case of using the 2D codebook structure.

A method of selecting 8 ports from 12 ports illustrated in FIG. 15(a) is as follows.

6. The channel between the ports of {0, 1, 2, 3, 6, 7, 8, 9} or {0, 3, 4, 5, 6, 9, 10, 11} and the UE may be measured and the PMI most preferred for the measured channel may be used. In other words, the UE may select the PMI indicating the most preferred precoding matrix in the 8-port codebook based on the channel measured by using the CSI-RS transmitted through the antenna ports constituted by {0, 1, 2, 3, 6, 7, 8, 9} or {0, 3, 4, 5, 6, 9, 10, 11}.

7. Alternatively, the channel between ports constituted by {0, 1, 2, 3, 6, 7, 8, 9} and the UE and the channel between {0, 3, 4, 5, 6, 9, 10, 11} and the UE are measured to select a PMI (e.g., PMI to maximize the CQI best (i.e., most preferred) for the weighted summation value.

8. Alternatively, 8 ports may be configured by selecting two predetermined columns in the port layout illustrated in FIG. 15(b). This may be extended similarly to methods 3 and 4 described above. As one example, a PMI may be selected, which is best for the channel between 8 ports constituted by a combination of the first and second columns, a combination of the first and third columns, or a combination of the second and third columns.

In method 7 and/or 8 above, as described above, a total of x (e.g., 12) multi-antenna ports may be grouped into a plurality of antenna port groups in units of y (e.g., 8) multi-antenna ports. Then, the entire channel may be derived by weight-summing the channels based on the reference signal transmitted on the antenna port in each antenna port group. The UE may select the PMI indicating the most preferred precoding matrix in the codebook of y multi-antenna ports based on the derived entire channel (e.g., $w_1h_1+w_2h_2$). In this case, the selected precoding matrix may be similarly applied to each antenna port group.

Alternatively, the UE may individually derive the channel for each antenna port group based on the reference signal transmitted on the antenna port in each antenna port group.

In addition, the UE may individually select the PMI indicating the most preferred precoding matrix in the codebook of y multi-antenna ports for each antenna port group. In this case, an independent precoding matrix which is independently determined may be applied for each antenna port group.

9. The methods proposed in schemes 6 to 8 above may be integrated for each rank or applied independently for each rank.

As one example, in the case of Rel. 13 codebook, in ranks 1 to 4 requiring high beam granularity, the predefined 2D codebook may be used and in ranks 5 to 8, the method proposed in schemes 6 to 8 above may be used.

When the method proposed in schemes 6 to 8 above is used, the complexity can be significantly reduced as compared with the case of using the 2D codebook structure.

Alternatively, the legacy 8Tx codebook may be used by selecting various ports according to four codebook configurations (i.e., 'Config' or 'codebookConfig') defined in the Rel. 13 codebook.

FIG. 16 illustrates a method for selecting an antenna port for each codebook configuration according to an embodiment of the present invention.

FIG. 16 illustrates an antenna port selection method for each codebook configuration (i.e., 'Config' or 'codebookConfig') in the (2, 4, 2, 16) antenna port layout.

Referring to FIG. 16, when codebook configuration 1 or 2 is configured in the UE, {0, 1, 4, 5, 8, 9, 12, 13} ports may be configured from all 16 ports.

Further, when codebook configuration 3 is configured in the UE, {0, 2, 5, 7, 8, 10, 13, 15} or {2, 3, 4, 5, 10, 11, 12, 13} ports may be selected from all 16 ports. In this case, in the case of codebook configuration 3, option a or b may be selected by the UE or configured by the base station.

Further, when codebook configuration 4 is configured in the UE, {0, 1, 2, 3, 8, 9, 10, 11} ports may be selected from all 16 ports.

As another example, a method using ports constituted by a complementary set of the selected ports in FIG. 16 may be used.

Using the method proposed above, information on the codebook configuration (i.e., 'Config' or 'codebookConfig') may be sent to the UE by the base station through the higher layer signaling (e.g., RRC signaling).

The UE may select the best (preferred) PMI (e.g., the PMI to maximize the CQI) by measuring the channel between the selected ports and the UE, which is illustrated in FIG. 16. In other words, the UE may select the PMI indicating the most preferred precoding matrix in the 8-port codebook based on the channel measured by using the CSI-RS transmitted through the antenna ports selected in FIG. 16.

FIG. 17 illustrates a method for selecting an antenna port for each codebook configuration according to an embodiment of the present invention.

FIG. 17 illustrates an antenna port selection method for each codebook configuration (i.e., 'Config' or 'codebookConfig') in the (2, 3, 2, 12) antenna port layout.

Referring to FIG. 17, when codebook configuration 1 or 2 is configured in the UE, {0, 1, 3, 4, 6, 7, 9, 10} or {1, 2, 4, 5, 7, 8, 10, 11} ports may be configured from all 12 ports. In this case, option a or b may be selected by the UE or configured by the base station.

Further, when codebook configuration 3 is configured in the UE, {0,1,4,5,6,7,10,11} or {1,2,3,4,7,8,9,10} ports may be selected from all 12 ports. In this case, option a or b may be selected by the UE or configured by the base station.

Further, when codebook configuration 4 is configured in the UE, {0, 1, 2, 3, 6, 7, 8, 9} or {0, 3, 4, 5, 6, 9, 10, 11} ports may be selected from all 12 ports. In this case, option a or b may be selected by the UE or configured by the base station.

As described above, the information on the codebook configuration (i.e., 'Config' or 'codebookConfig') may be sent to the UE by the base station through the higher layer signaling (e.g., RRC signaling).

The UE may select the best (preferred) PMI (e.g., the PMI to maximize the CQI) by measuring the channel between the selected ports and the UE, which is illustrated in FIG. 17. In other words, the UE may select the PMI indicating the most preferred precoding matrix in the 8-port codebook based on the channel measured by using the CSI-RS transmitted through the antenna ports selected in FIG. 17.

As described above, when the selected antenna port is determined according to the codebook configuration configured in the UE, schemes 1 to 4 (or schemes 6 to 8) described above may be independently applied according to each codebook configuration.

In the foregoing description, the fat antenna array having a larger number of rows than the number of rows has been described for the sake of convenience. However, the present invention is not limited thereto, and it is needless to say that the above-described scheme may be applied to a tall antenna array having a larger number of rows than the number of columns.

Figure 18:
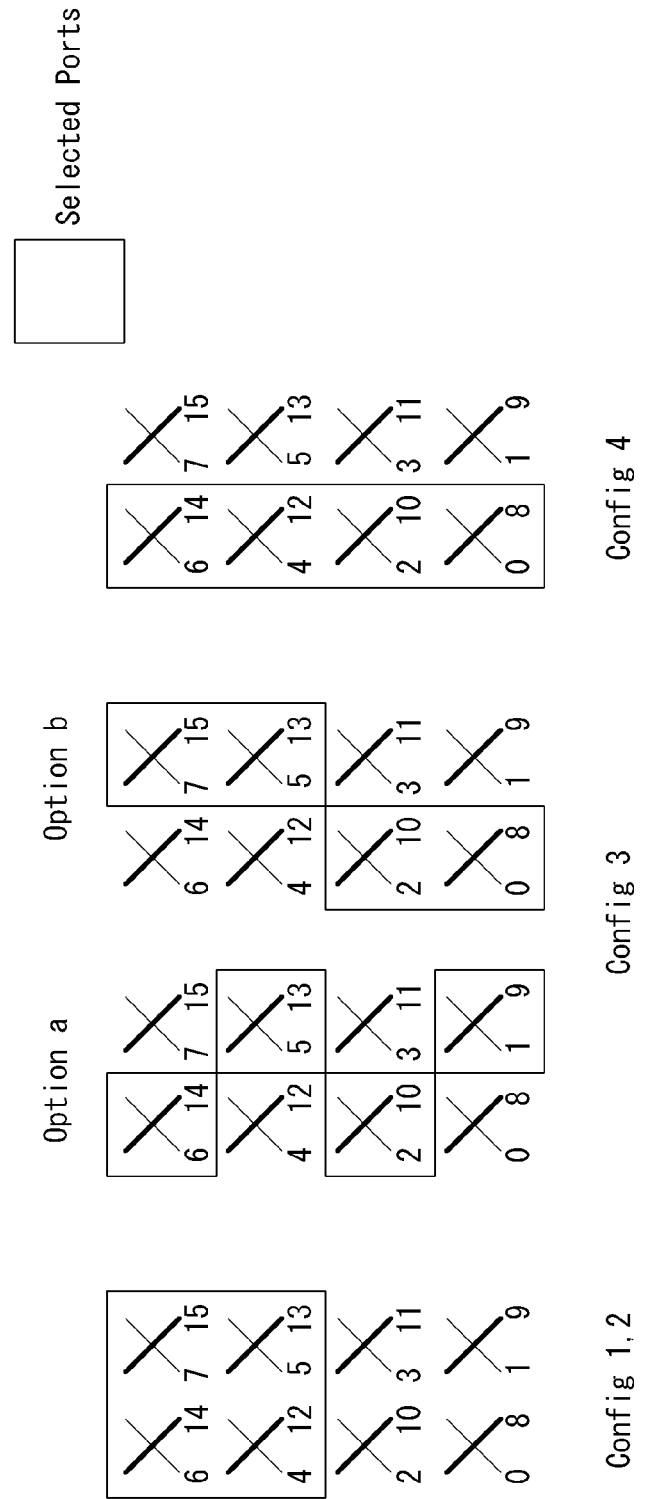
FIG. 18 illustrates a method for selecting an antenna port for each codebook configuration according to an embodiment of the present invention.

FIG. 18 illustrates a method for selecting an antenna port for each codebook configuration according to an embodiment of the present invention.

FIG. 18 illustrates an antenna port selection method for each codebook configuration (i.e., 'Config' or 'codebookConfig') in the (4, 2, 2, 16) antenna port layout.

Referring to FIG. 18, when codebook configuration 1 or 2 is configured in the UE, {4, 5, 6, 7, 12, 13, 14, 15} ports may be selected from all 16 ports.

Further, when codebook configuration 3 is configured in the UE, {1, 2, 5, 6, 9, 10, 13, 14} or {0, 2, 5, 7, 8, 10, 13, 15} ports may be selected from all 16 ports. In this case, in the case of codebook configuration 3, option a orb may be selected by the UE or configured by the base station.

Further, when codebook configuration 4 is configured in the UE, {0, 2, 4, 6, 8, 10, 12, 14} ports may be selected from all 16 ports.

As another example, a method using ports constituted by a complementary set of the selected ports in FIG. 18 may be used.

Using the method proposed above, information on the codebook configuration (i.e., 'Config' or 'codebookConfig') may be sent to the UE by the base station through the higher layer signaling (e.g., RRC signaling).

The UE may select the best (preferred) PMI (e.g., the PMI to maximize the CQI) by measuring the channel between the selected ports and the UE, which is illustrated in FIG. 18. In other words, the UE may select the PMI indicating the most preferred precoding matrix in the 8-port codebook based on the channel measured by using the CSI-RS transmitted through the antenna ports selected in FIG. 18.

Similar to the fat antenna port layout, and even when the present invention is applied to the tall antenna port layout, schemes 1 to 4 (or schemes 6 to 8) described above may be independently applied according to each codebook configuration and/or for each rank.

The operation in the case of using the proposed scheme will be described as follows.

The eNB may transmit an X-port reference signal (e.g., CSI-RS) to the UE. Then, the UE may calculate a preferred CSI (e.g., PMI, CQI, RI, etc.) using the y-port (y<x) codebook predefined with the eNB.

In this case, when the y-port codebook (e.g., legacy 8Tx codebook) is used in a specific rank(s), the preferred CSI may be calculated as a value in which transmission power is reduced as compared with the rank(s) using the code book using all of X ports at the time of calculating the preferred CSI (e.g., PMI, CQI, RI, etc.) and reported to the base station. When the port that is not used for PDSCH transmission is turned off and the transmission power of the corresponding port is borrowed and beamformed and transmitted, the channel feedback information of the CSI (for example, PMI, CQI, RI, etc.) is set to a value to be very conservative, and as a result, there is a high probability that a higher rank will be transmitted.

For example, when the total number of antenna ports is 16, the specific rank(s) using the 8Tx codebook is ½ the CSI-RS transmission power corresponding to the codebook as compared to the rank(s) using all 16 ports. Therefore, such a value is used to calculate the preferred CSI (e.g., PMI, CQI, RI, etc.), so that significant conservative feedback is achieved. Therefore, for more aggressive feedback, the UE may calculate the CSI (for example, PMI, CQI, RI, etc.) by doubling the transmission power at the time of calculating the CSI (for example, PMI, CQI, RI, etc.) for the specific rank(s) in which the legacy 8Tx codebook is used. In addition, the UE may report the preferred CSI (e.g., PMI, CQI, RI, etc.) to the base station.

Although the legacy 8Tx codebook has been described in the above description, the present invention is not limited thereto. That is, when it may be expanded more generally, when a calculation assumption of the CSI (for example, PMI, CQI, RI, etc.) different for each specific rank(s) such as an environment using a codebook for Y-Tx in a Y-port (X>Y) smaller than X antenna port provided in the eNB with respect to the specific rank(s) is required, the UE may calculate the CSI (for example, PMI, CQI, RI, etc.) by considering PDSCH transmission power boosting at the time of calculating the CSI (for example, PMI, CQI, RI, etc.). That is, in the CSI calculation, the UE may compensate the power loss by multiplying the calculation metric by $\alpha=X/Y$ (e.g., the power compensation factor).

The CSI may be pre-agreed between the UE and the base station for the specific rank(s) using the Y-Tx codebook in the Y-port (X>Y) smaller than the X antenna port of the eNB or the base station may inform of the CSI the UE through the higher layer signaling (e.g., RRC signaling).

In the CSI calculation, a coefficient (i.e., power compensation coefficient) $\alpha$ for considering the PDSCH transmission power boosting may be pre-agreed between the UE and the base station or the base station may inform of the coefficient the UE through the higher layer signaling (e.g., RRC signaling).

In the CSI calculation, for calculating the coefficient (i.e., power compensation coefficient) $\alpha$ for considering the PDSCH transmission power boosting, a Y value may be pre-agreed between the UE and the base station or the base station may inform of the Y value the UE through the higher layer signaling (e.g., RRC signaling). In this case, it may be assumed that the UE knows an X value in advance.

The base station may inform of whether to use the aggressive feedback scheme proposed above to the UE through the higher layer signaling (for example, RRC signaling).

The proposed contents may be easily applied even to a case where the antenna port is operated as a partial port in the entire antenna port and easily applied even when multiple partial ports are configured.

As one example, an antenna port selection scheme proposed by the present invention may be similarly applied even in a panel antenna array.

Figure 19:
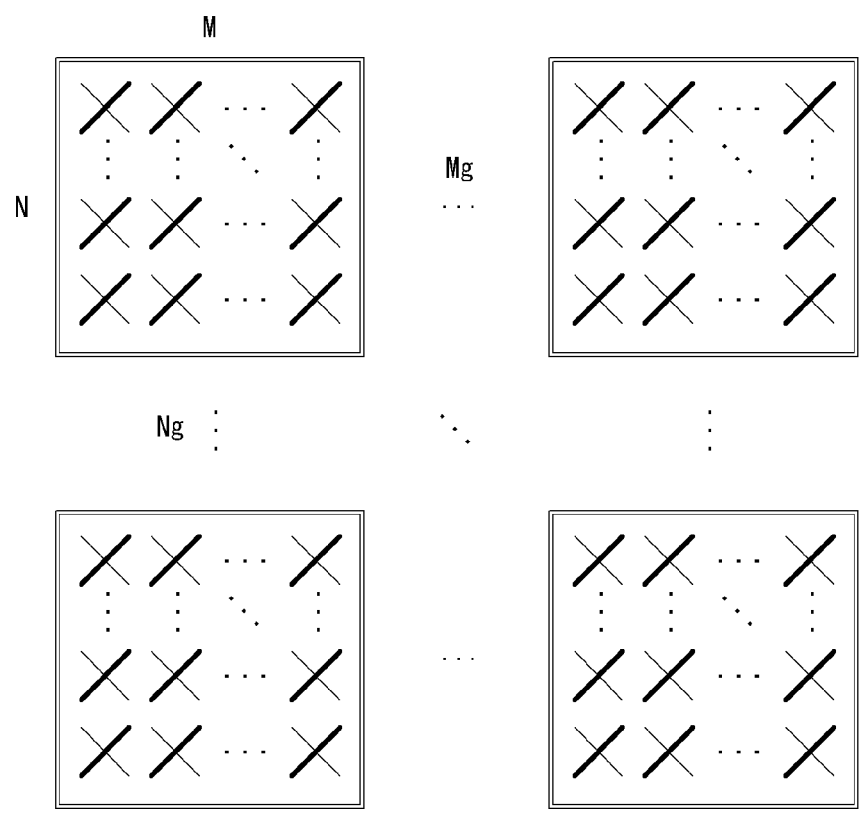
FIGS. 19 and 20 illustrate a panel antenna array to which the present invention may be applied.

FIG. 19 illustrates a panel antenna array to which the present invention may be applied.

Referring to FIG. 19, the panel antenna array may be constituted by Mg panels and Ng panels in a horizontal domain and a vertical domain, respectively. In addition, a single panel is constituted by M rows and N rows and in the example of FIG. 19, a cross polarization (X-pol) antenna is assumed.

Therefore, the total number of antenna elements is 2*M*N*Mg*Ng.

In this case, the UE may select the PMI indicating the most preferred precoding matrix in the 2*M*N-port codebook based on the channel measured by using the CSI-RS transmitted through the antenna ports belonging to the selected antenna panel and report the PMI to the base station.

Alternatively, for example, a total of 2*M*N*Mg*Ng antenna ports may be grouped into a plurality of antenna port groups in units of 2*M*N antenna ports (i.e., in units of panel). Then, the entire channel may be derived by weight-summing the channels based on the reference signal transmitted on the antenna port in each antenna port group. The UE may select the PMI indicating the most preferred precoding matrix in the codebook of 2*M*N antenna ports based on the derived entire channel. In this case, the selected precoding matrix may be similarly applied to each antenna port group.

Alternatively, the UE may individually derive the channel for each antenna port group based on the reference signal transmitted on the antenna port in each antenna port group. In addition, the UE may individually select the PMI indicating the most preferred precoding matrix in the codebook of 2*M*N antenna ports for each antenna port group. In this case, an independent precoding matrix which is independently determined may be applied for each antenna port group.

Figure 20:
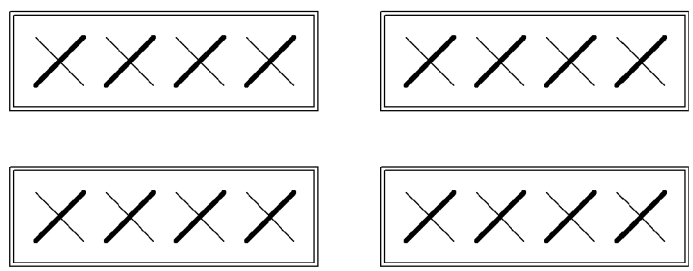

FIG. 20 illustrates a panel antenna array to which the present invention may be applied.

As illustrated in FIG. 20, when one panel to which analog beamforming (i.e., TXRU virtualization) is applied is constituted by 8 ports, in the case of digital beamforming, the legacy 8-tx codebook may be applied per each panel like the method proposed by the present invention.

In this case, the UE may select the PMI indicating the most preferred precoding matrix in the 8-port codebook based on the channel measured by using the CSI-RS transmitted through the antenna ports belonging to the selected antenna panel and report the PMI to the base station.

As another example, when the channels between the respective panels and the UE are defined as h1, h2, h3, and h4, the UE may measure the channel of $w_1h_1+w_2h_2+w_3h_3+w_4h_4$ and report the index (i.e., PMI) indicating the most preferred precoding matrix to the base station. In other words, all antenna ports may be grouped into the plurality of antenna port groups in units of 8 antenna ports (i.e., in units of panel). Then, the entire channel may be derived by weight-summing the channels based on the reference signal transmitted on the antenna port in each antenna port group. The UE may select the PMI indicating the most preferred precoding matrix in the codebook of 8-port antenna ports based on the derived entire channel. In this case, the selected precoding matrix may be similarly applied to each antenna port group.

Further, for all-channel reporting, the UE may independently report THE weight value and THE PMI corresponding to each channel. In other words, the UE may individually derive the channel for each antenna port group based on the reference signal transmitted on the antenna port in each antenna port group. In addition, the UE may individually select the PMI indicating the most preferred precoding matrix in the codebook of 8-port antenna ports for each antenna port group. In this case, an independent precoding matrix which is independently determined may be applied for each antenna port group.

Figure 21:
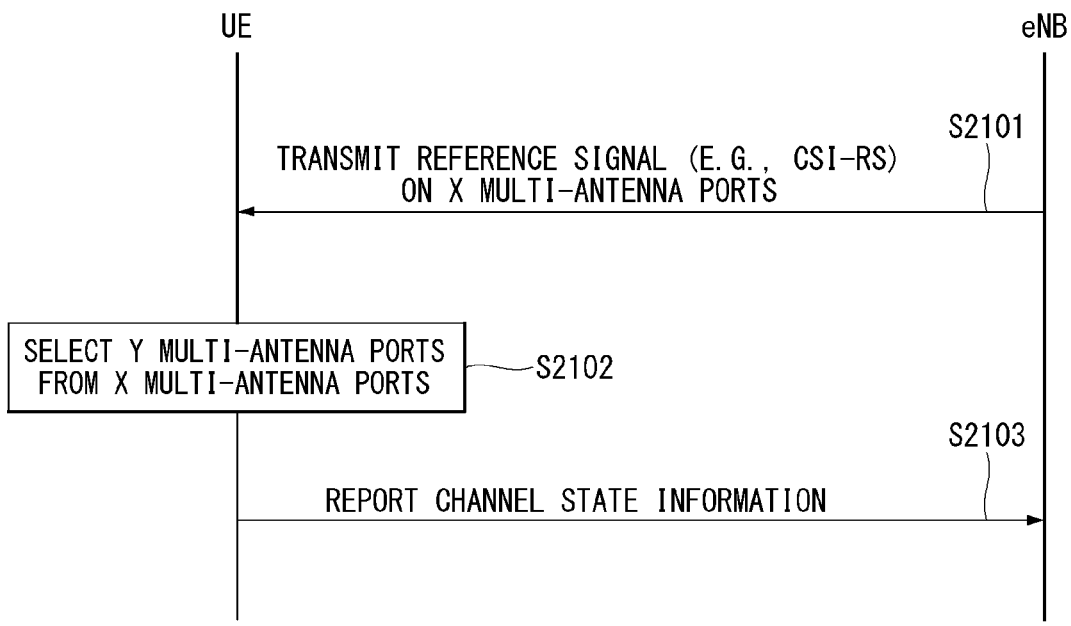
FIG. 21 is a diagram illustrating a method for reporting channel state information according to an embodiment of the present invention.

FIG. 21 is a diagram illustrating a method for reporting channel state information according to an embodiment of the present invention.

Referring to FIG. 21, a UE receives a reference signal (for example, CSI-RS) on x multiple antenna ports from a base station (S2101).

The UE selects y multi-antenna ports among x multi-antenna ports (S2102).

In this case, y multi-antenna ports may be selected by the aforementioned scheme (for example, FIGS. 16 to 20). As one example, an antenna port having the same antenna port layout to which a codebook for y multi-antenna ports among x multi-antenna ports may be applied may be selected.

Further, the y multi-antenna ports may be selected according to a codebook configuration (i.e., 'Config' or 'codebook-Config'). In this case, the UE may receive the codebook configuration from the base station through higher layer signaling (e.g., RRC signaling).

The UE reports channel state information (e.g., RI, PMI, CQI, etc.) derived based on a reference signal (e.g., CSI-RS) on y multiple antenna ports to the base station (S2103).

That is, the UE may derive the channel state information using the codebook for y multi-antenna ports. In other words, the UE may calculate the RI based on the assumption of transmission of y multi-antenna ports and calculate the PMI and the CQI under a condition of the reported RI. In particular, the PMI may indicate a precoding matrix selected from the codebook for y multi-antenna ports.

In this case, the precoding matrix may be selected to maximize a channel quality indicator (CQI) derived based on the CSI-RS transmitted on the y multi-antenna ports.

Further, the x multiple antenna ports may be grouped into a plurality of antenna groups (e.g., a first antenna port group and a second antenna port group) in units of y multi-antenna ports. Then, the precoding matrix may be selected based on the weighted summation of respective channels measured based on the CSI transmitted on the antenna port in each antenna port group.

In this case, the precoding matrix may be similarly applied to each antenna port group. Alternatively, the precoding matrix may be independently selected for each antenna port group.

For example, the precoding matrix may be selected based on a weighted summation of a first channel measured based on the CSI-RS transmitted on the antenna port in a first antenna port group and a second channel measured based on the CSI-RS transmitted on the antenna port in a second antenna port group. In this case, a first weight may be applied to the first channel and a second weight may be applied to the second channel, and then may be summed.

In this case, the weights (e.g., the first weight and the second weight) applied to the channel measured in each antenna port group may be predetermined or may be provided from the base station to the UE by radio resource control (RRC) signaling.

Alternatively, the weights (e.g., the first weight and the second weight) applied to the channel measured in each antenna port group may be predetermined by the UE and reported to the base station.

Here, the weights (e.g., the first weight and the second weight) applied to the channel measured in each antenna port group may be predetermined from a predetermined weight vector codebook. In this case, the entirety or a subset of the weight vector codebook may be used according to the number of feedback bits for reporting the weights (e.g., the first weight and the second weight) applied to the channel measured in each antenna port group.

Further, the CSI for y multi-antenna ports may be calculated by multiplying by the power compensation coefficient at the time of the CSI calculation. In this case, the power compensation coefficient may be predetermined or may be provided from the base station to the UE by the radio resource control (RRC) signaling. Further, whether the CSI for y multi-antenna ports is calculated by multiplying by the power compensation coefficient may be provided from the base station by the radio resource control (RRC) signaling.

Steps S2102 and S2103 above may be performed only in the case of a specific rank. That is, only in the case of the specific rank, y multi-antenna ports may be selected among x multi-antenna ports. In this case, the specific rank may be predetermined or may be provided from the base station to the UE by the radio resource control (RRC) signaling.

General Apparatus to which Present Invention is Applicable

Figure 22:
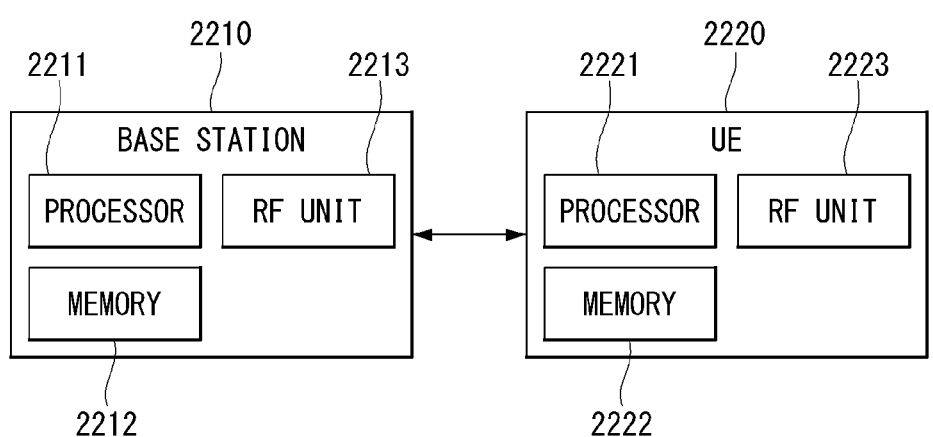
FIG. 22 illustrates a block diagram of a wireless communication apparatus according to an embodiment of the present invention.

FIG. 22 illustrates a block diagram of a wireless communication apparatus according to an embodiment of the present invention.

Referring to FIG. 22, a wireless communication system includes a base station 2210 and multiple UEs 2210 positioned within an area of the base station 2220.

The base station 2210 includes a processor 2211, a memory 2212, and a radio frequency (RF) unit 2213. The processor 2211 implements a function, a process, and/or a method which are proposed in FIGS. 1 to 21 above. Layers of a radio interface protocol may be implemented by the processor 2211. The memory 2212 is connected with the processor 2211 to store various pieces of information for driving the processor 2211. The RF unit 2213 is connected with the processor 2211 to transmit and/or receive a radio signal.

The UE 2220 includes a processor 2221, a memory 2222, and an RF unit 2223. The processor 2221 implements a function, a process, and/or a method which are proposed in FIGS. 1 to 21 above. Layers of a radio interface protocol may be implemented by the processor 2221. The memory 2222 is connected with the processor 2221 to store various pieces of information for driving the processor 2221. The RF unit 2223 is connected with the processor 2221 to transmit and/or receive a radio signal.

The memories 2212 and 2222 may be positioned inside or outside the processors 2211 and 2221 and connected with the processors 2211 and 2221 by various well-known means.

Further, the base station 2210 and/or the UE 2220 may have a single antenna or multiple antennas.

In the embodiments described above, the components and the features of the present invention are combined in a predetermined form. Each component or feature should be considered as an option unless otherwise expressly stated. Each component or feature may be implemented not to be associated with other components or features. Further, the embodiment of the present invention may be configured by associating some components and/or features. The order of the operations described in the embodiments of the present invention may be changed. Some components or features of any embodiment may be included in another embodiment or replaced with the component and the feature corresponding to another embodiment. It is apparent that the claims that are not expressly cited in the claims are combined to form an embodiment or be included in a new claim by an amendment after the application.

The embodiments of the present invention may be implemented by hardware, firmware, software, or combinations thereof. In the case of implementation by hardware, according to hardware implementation, the exemplary embodiment described herein may be implemented by using one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, and the like.

In the case of implementation by firmware or software, the embodiment of the present invention may be implemented in the form of a module, a procedure, a function, and the like to perform the functions or operations described above. A software code may be stored in the memory and executed by the processor. The memory may be positioned inside or outside the processor and may transmit and receive data to/from the processor by already various means.

It is apparent to those skilled in the art that the present invention may be embodied in other specific forms without departing from essential characteristics of the present invention. Accordingly, the aforementioned detailed description should not be construed as restrictive in all terms and should be exemplarily considered. The scope of the present invention should be determined by rational construing of the appended claims and all modifications within an equivalent scope of the present invention are included in the scope of the present invention.

INDUSTRIAL APPLICABILITY

An example is applied to the 3GPP LTE/LTE-A system is described primarily, but it is possible to apply the RRC connection method to various wireless communication systems in addition to the 3GPP LTE/LTE-A system.

The invention claimed is:

1. A method for reporting, by a user equipment (UE), channel state information (CSI) in a multi-antenna wireless communication system, the method comprising:
    receiving a channel state information reference signal (CSI-RS) on x multiple antenna ports from a base station, where x is a natural number;
    selecting y multi-antenna ports among the x multi-antenna ports, where y is a natural number; and
    reporting to the base station a precoding matrix indicator (PMI) indicating a precoding matrix selected from a codebook for the y multi-antenna ports,
    wherein the x multi-antenna ports are grouped into a first antenna port group and a second antenna port group in units of the y multi-antenna ports,
    wherein the precoding matrix is selected based on a weighted summation of a first channel measured based on the CSI-RS transmitted on the antenna port in the first antenna port group and a second channel measured based on the CSI-RS transmitted on the antenna port in the second antenna port group, and
    wherein the precoding matrix is similarly applied to the first antenna port group and the second antenna port group.

2. The method of claim 1, wherein the precoding matrix is selected to maximize a channel quality indicator (CQI) derived based on the CSI-RS transmitted on the y multi-antenna ports.

3. The method of claim 1, wherein the y multi-antenna ports are selected with the same antenna port as the antenna port layout applicable to the codebook for the y multi-antenna ports among the x multi-antenna ports.

4. The method of claim 1, wherein the first channel and the second channel are summed by a first weight and a second weight, respectively, and
    wherein the first weight and the second weight are predetermined or provided from the base station to the UE through radio resource (RRC) signaling.

5. The method of claim 1, wherein the first channel and the second channel are summed by the first weight and the second weight, respectively, and
    wherein the first weight and the second weight are determined by the UE and reported to the base station.

6. The method of claim 5, wherein the first weight and the second weight are determined from a predetermined weight vector codebook.

7. The method of claim 6, wherein the entirety or a subset of the weight vector codebook is used according to the number of feedback bits for reporting the first weight and the second weight.

8. The method of claim 1, further comprising:
    receiving a codebook configuration from the base station,
    wherein the y multi-antenna ports are selected according to the codebook configurations.

9. The method of claim 1, wherein the CSI for the y multi-antenna ports is calculated by multiplying by a power compensation coefficient at the time of the CSI calculation, and
    wherein the power compensation coefficient is predetermined or provided from the base station to the UE by radio resource control (RRC) signaling.

10. The method of claim 9, wherein whether the CSI for the y multi-antenna ports is calculated by multiplying by the power compensation coefficient is provided from the base station through the radio resource control (RRC) signaling.

11. The method of claim 1, wherein only in the case of a specific rank, the y multi-antenna ports are selected among the x multi-antenna ports, and
    wherein the specific rank is predetermined or provided from the base station to the UE by the radio resource control (RRC) signaling.

12. A user equipment (UE) for reporting channel state information (CSI) in a multi-antenna wireless communication system, the UE comprising:
    a transceiver configured to transmit and receive a radio signal; and
    a processor configured to control the transceiver,
    wherein the processor;
    receives a channel state information reference signal (CSI-RS) on x multiple antenna ports from a base station, where x is a natural number,
    selects y multi-antenna ports among the x multi-antenna ports, where y is a natural number, and
    reports to the base station a precoding matrix indicator (PMI) indicating a precoding matrix selected from a codebook for the y multi-antenna ports, wherein the x multi-antenna ports are grouped into a first antenna port group and a second antenna port group in units of the y multi-antenna ports, wherein the precoding matrix is selected based on a weighted summation of a first channel measured based on the CSI-RS transmitted on the antenna port in the first antenna port group and a second channel measured based on the CSI-RS transmitted on the antenna port in the second antenna port group, and wherein the precoding matrix is similarly applied to the first antenna port group and the second antenna port group.

* * * * *